United States Patent
Hagiwara

(10) Patent No.: US 9,664,885 B2
(45) Date of Patent: May 30, 2017

(54) ZOOM LENS AND IMAGE PICKUP APPARATUS INCLUDING ZOOM LENS

(71) Applicant: CANON KABUSHIKI KAISHA, Tokyo (JP)

(72) Inventor: Yasuaki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 14/272,016

(22) Filed: May 7, 2014

(65) Prior Publication Data

US 2014/0333821 A1    Nov. 13, 2014

(30) Foreign Application Priority Data

May 10, 2013    (JP) .................................. 2013-099925

(51) Int. Cl.
| | |
|---|---|
| *G02B 27/64* | (2006.01) |
| *G02B 15/14* | (2006.01) |
| *G02B 15/173* | (2006.01) |

(52) U.S. Cl.
CPC ........... *G02B 15/173* (2013.01); *G02B 15/14* (2013.01); *G02B 27/64* (2013.01); *G02B 27/646* (2013.01)

(58) Field of Classification Search
CPC ........ G02B 15/00; G02B 15/14; G02B 15/15; G02B 15/16; G02B 27/64; G02B 27/646; G02B 15/163; G02B 15/167; G02B 15/17; G02B 27/6463

See application file for complete search history.

(56) References Cited

U.S. PATENT DOCUMENTS

| | | | | |
|---|---|---|---|---|
| 5,751,496 A | * | 5/1998 | Hamano | G02B 15/173 359/677 |
| 6,462,885 B2 | * | 10/2002 | Nishio | G02B 27/646 359/557 |
| 7,369,325 B2 | * | 5/2008 | Sato | G02B 15/173 359/686 |
| 7,692,862 B2 | | 4/2010 | Tanaka | |
| 8,238,040 B2 | * | 8/2012 | Miwa | G02B 15/173 359/554 |

(Continued)

FOREIGN PATENT DOCUMENTS

| | | |
|---|---|---|
| JP | 2009-047903 A | 3/2009 |
| JP | 2009-282398 A | 12/2009 |

(Continued)

*Primary Examiner* — Thong Nguyen
(74) *Attorney, Agent, or Firm* — Canon U.S.A., Inc. IP Division

(57) ABSTRACT

A zoom lens includes, in order from object side to image side, a first lens unit having positive refractive power; a second lens unit having negative refractive power; a third lens unit having positive refractive power; and a rear lens group including one or more lens units. During zooming, three or more lens units move to change an interval between adjacent lens units. The third lens unit includes, in order from object side to image side, a first lens subunit having positive refractive power, a second lens subunit having negative refractive power, and a third lens subunit having positive refractive power. The second lens subunit moves in a direction having a component perpendicular to the optical axis regarding image blurring correction, a focal length of the zoom lens at the telephoto end and a focal length of the third lens unit are set to satisfy specific mathematical conditions.

15 Claims, 26 Drawing Sheets

(56) References Cited

U.S. PATENT DOCUMENTS

| | | | | |
|---|---|---|---|---|
| 8,553,339 B2* | 10/2013 | Yamanaka | ............ | G02B 15/173 359/764 |
| 2009/0251797 A1* | 10/2009 | Saruwatari | ........... | G02B 27/646 359/687 |
| 2009/0290232 A1* | 11/2009 | Hagiwara | ............ | G02B 27/646 359/695 |
| 2010/0289926 A1* | 11/2010 | Tanaka | ................. | G02B 15/173 348/240.3 |
| 2012/0154913 A1* | 6/2012 | Misaka | ................ | G02B 27/646 359/557 |

FOREIGN PATENT DOCUMENTS

| | | |
|---|---|---|
| JP | 2011-081113 A | 4/2011 |
| JP | 2011170086 A | 9/2011 |
| JP | 2013-257508 A | 12/2013 |
| JP | 2014-098794 A | 5/2014 |
| JP | 2014-098795 A | 5/2014 |
| JP | 2014-137407 A | 7/2014 |
| JP | 2014-137408 A | 7/2014 |
| JP | 2014-137409 A | 7/2014 |

* cited by examiner

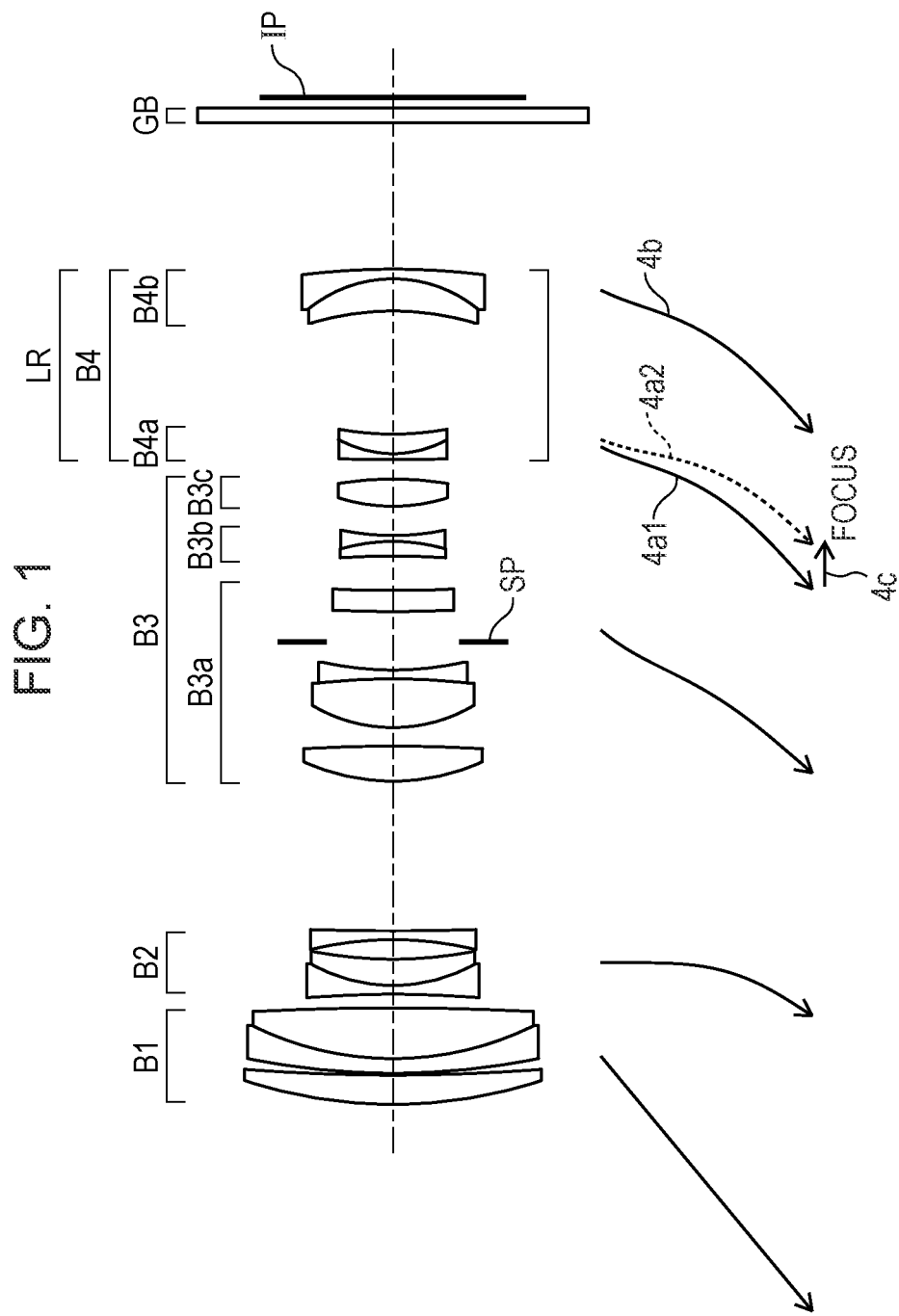

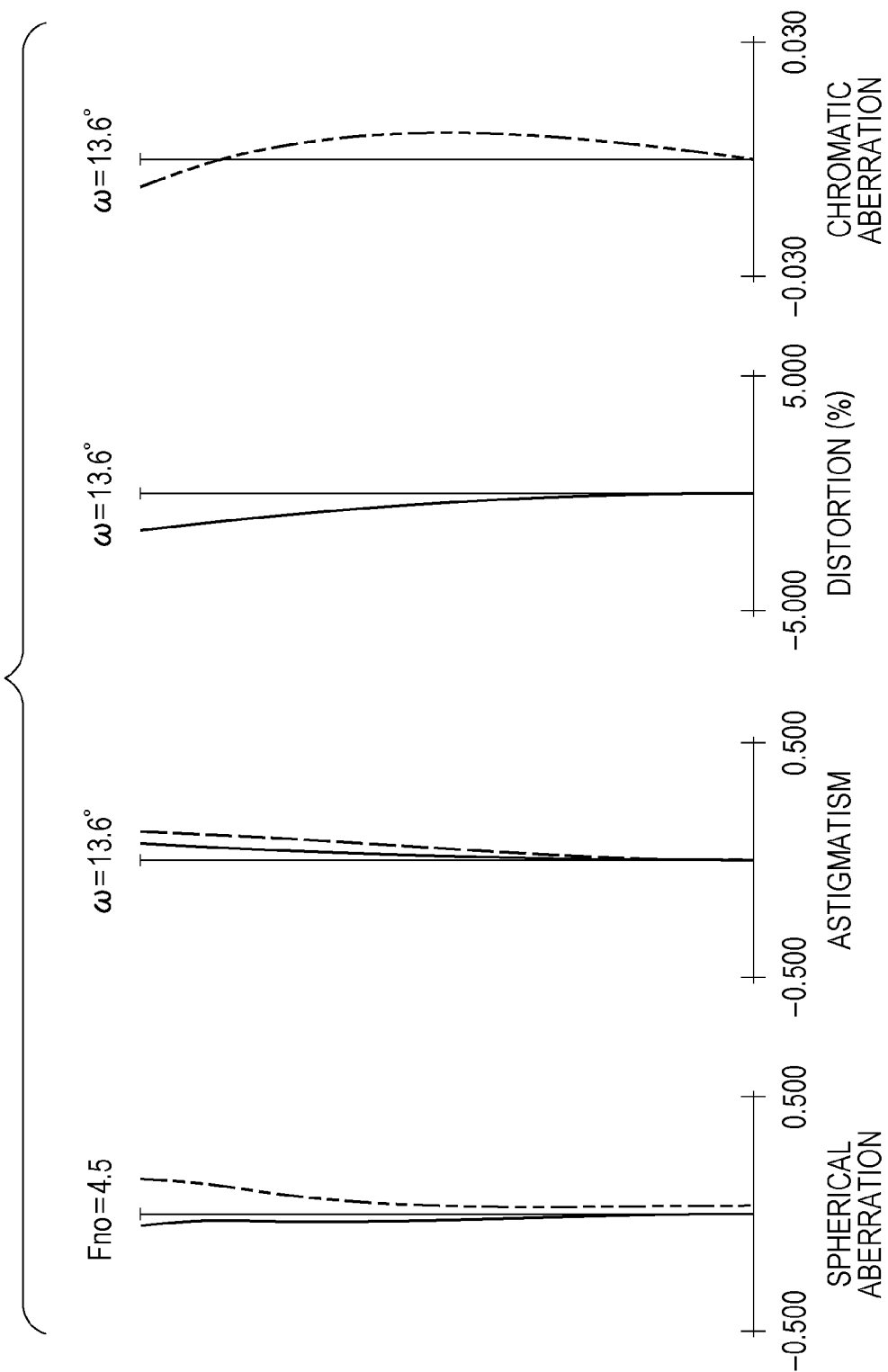

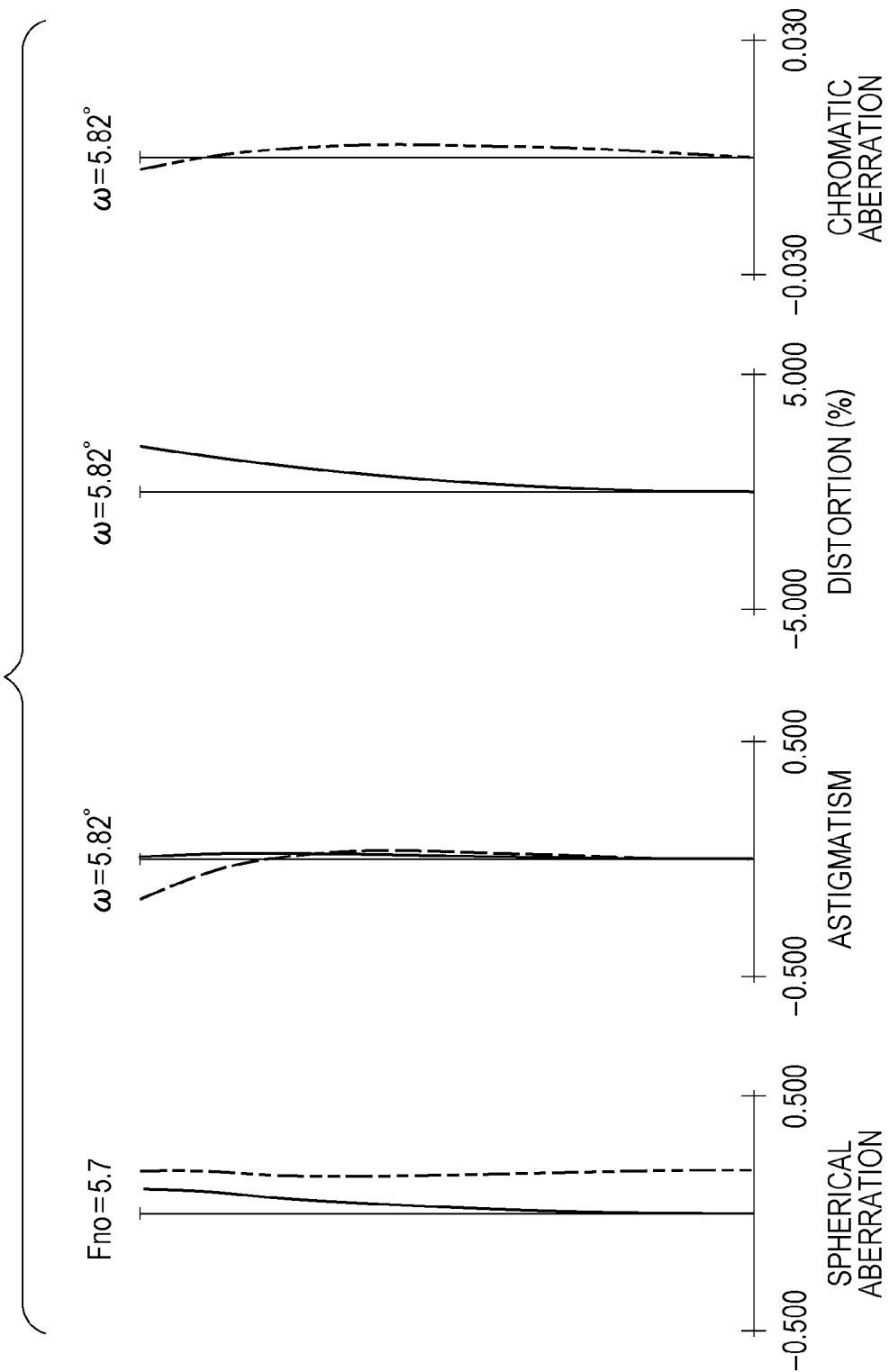

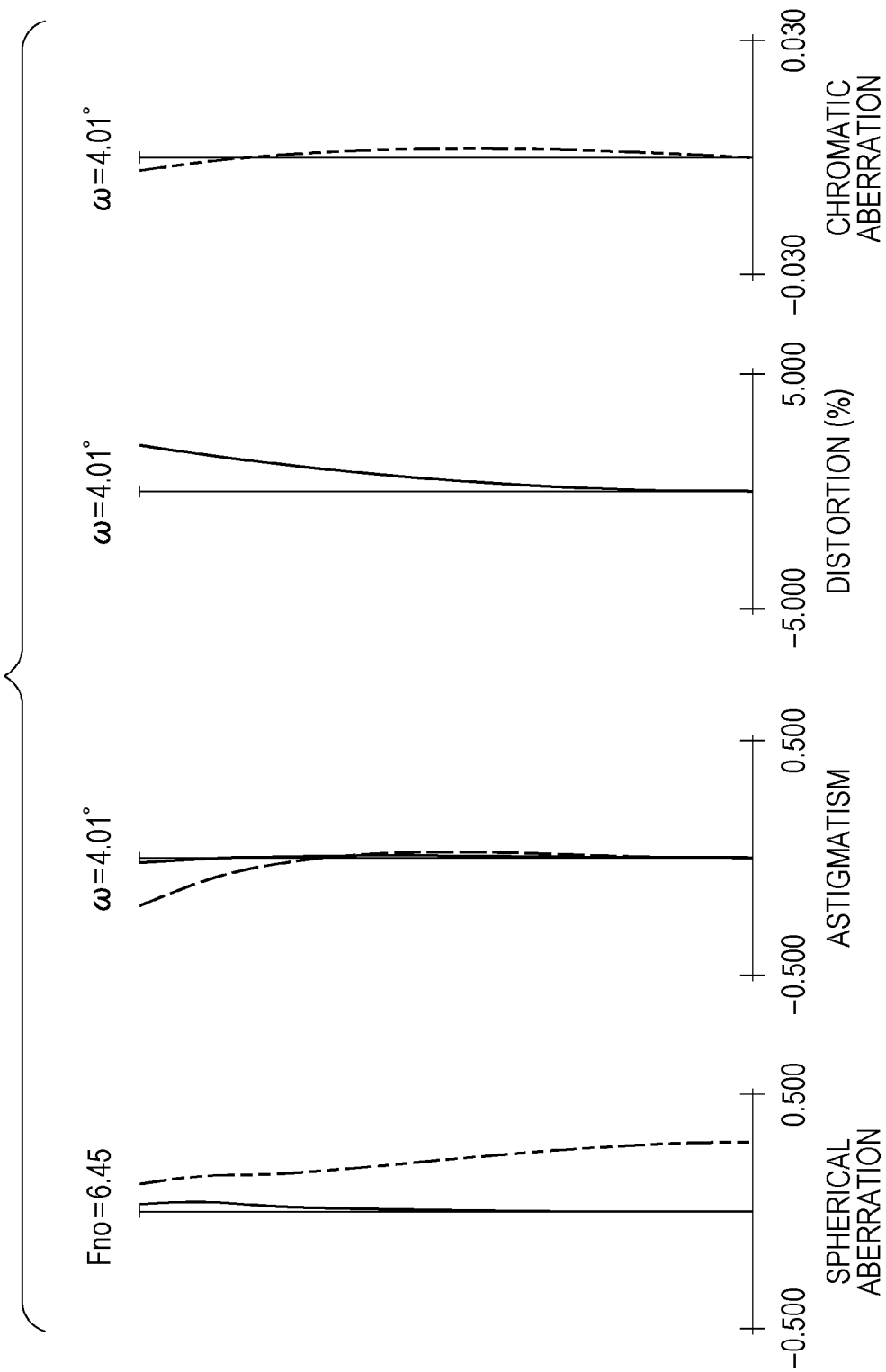

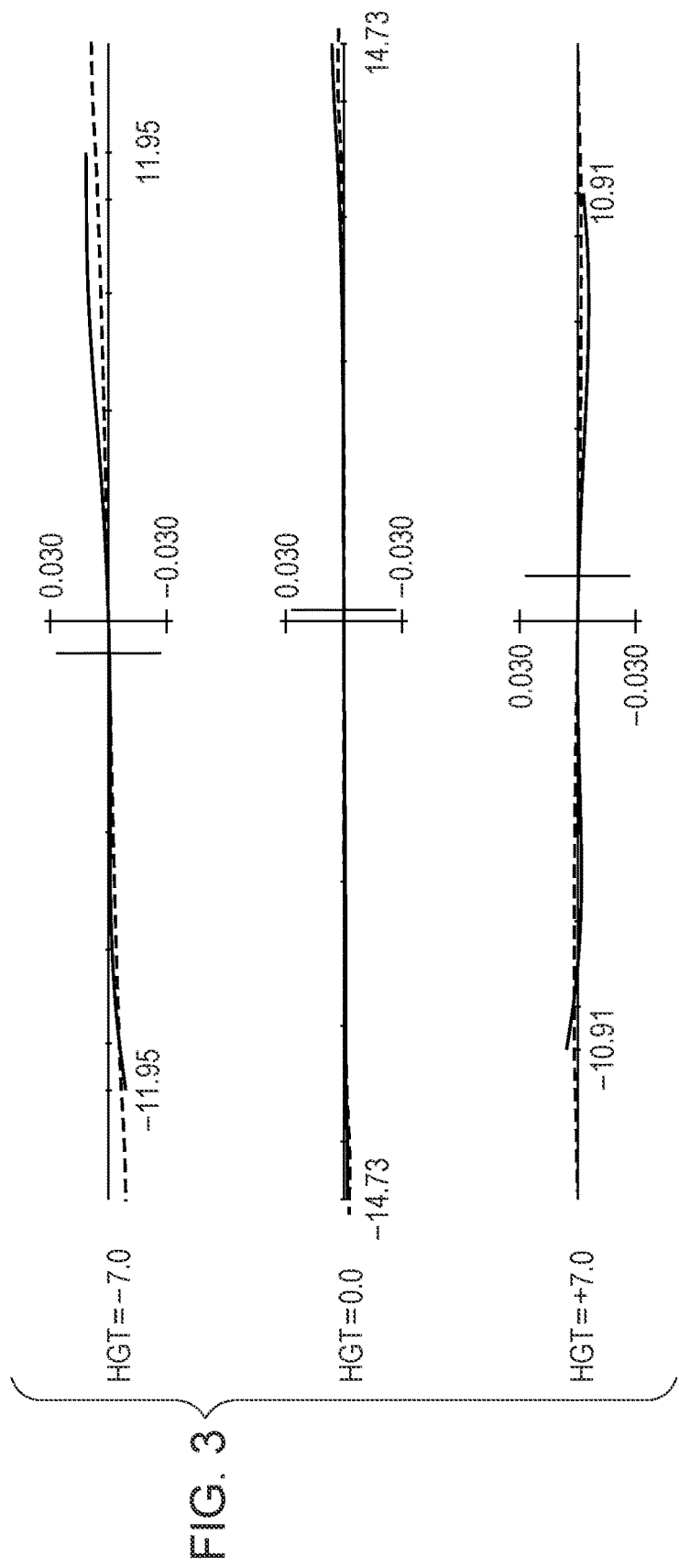

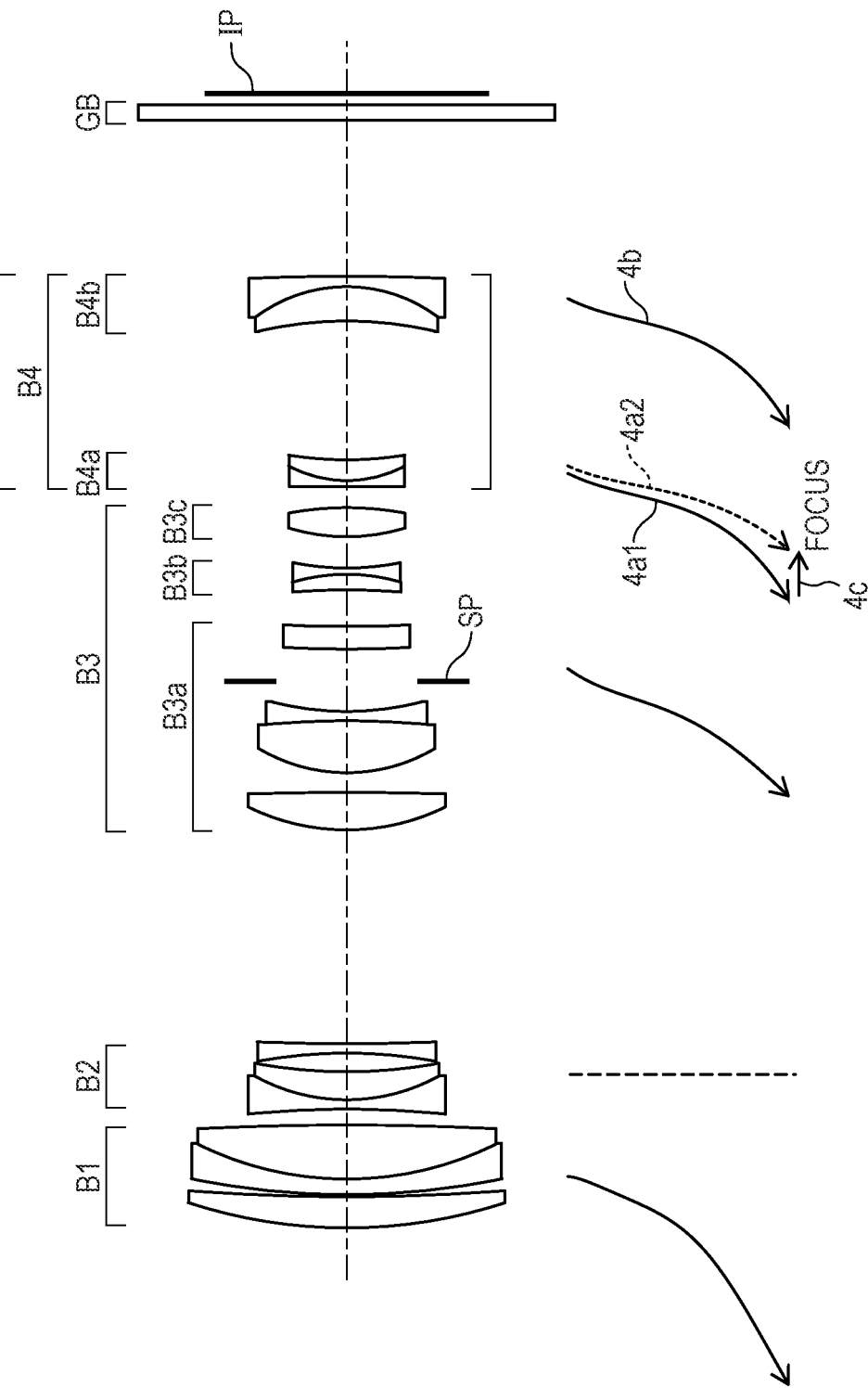

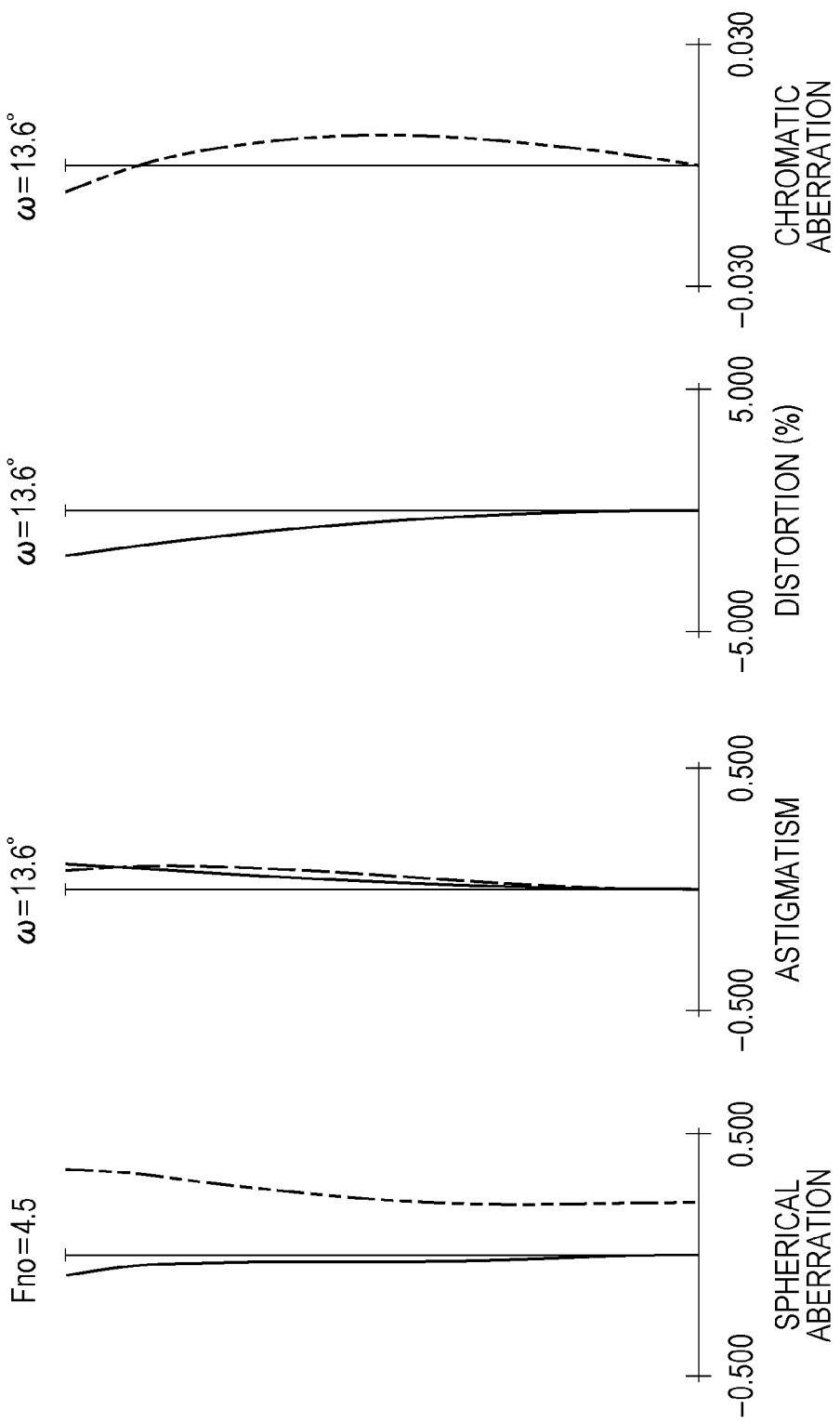

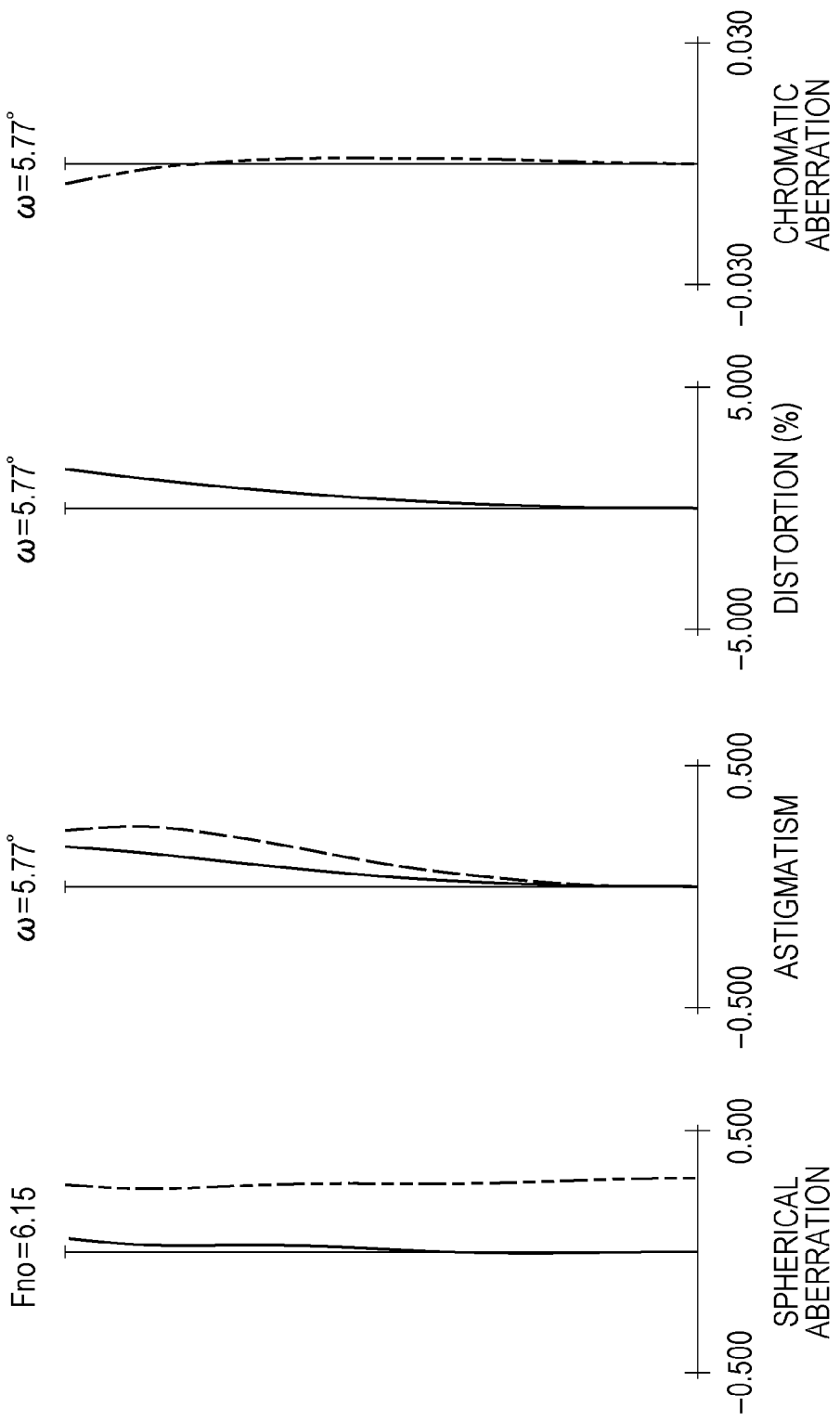

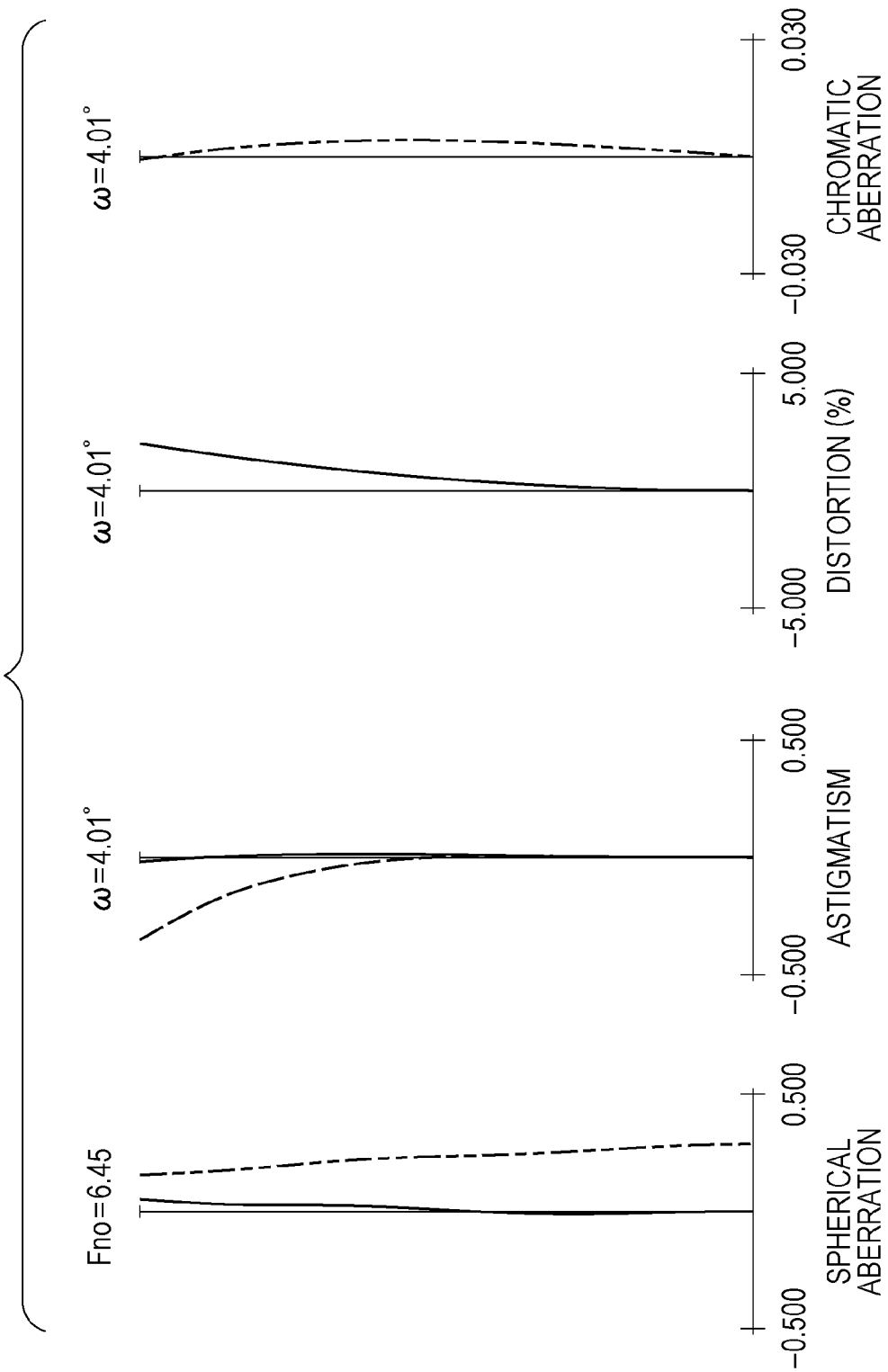

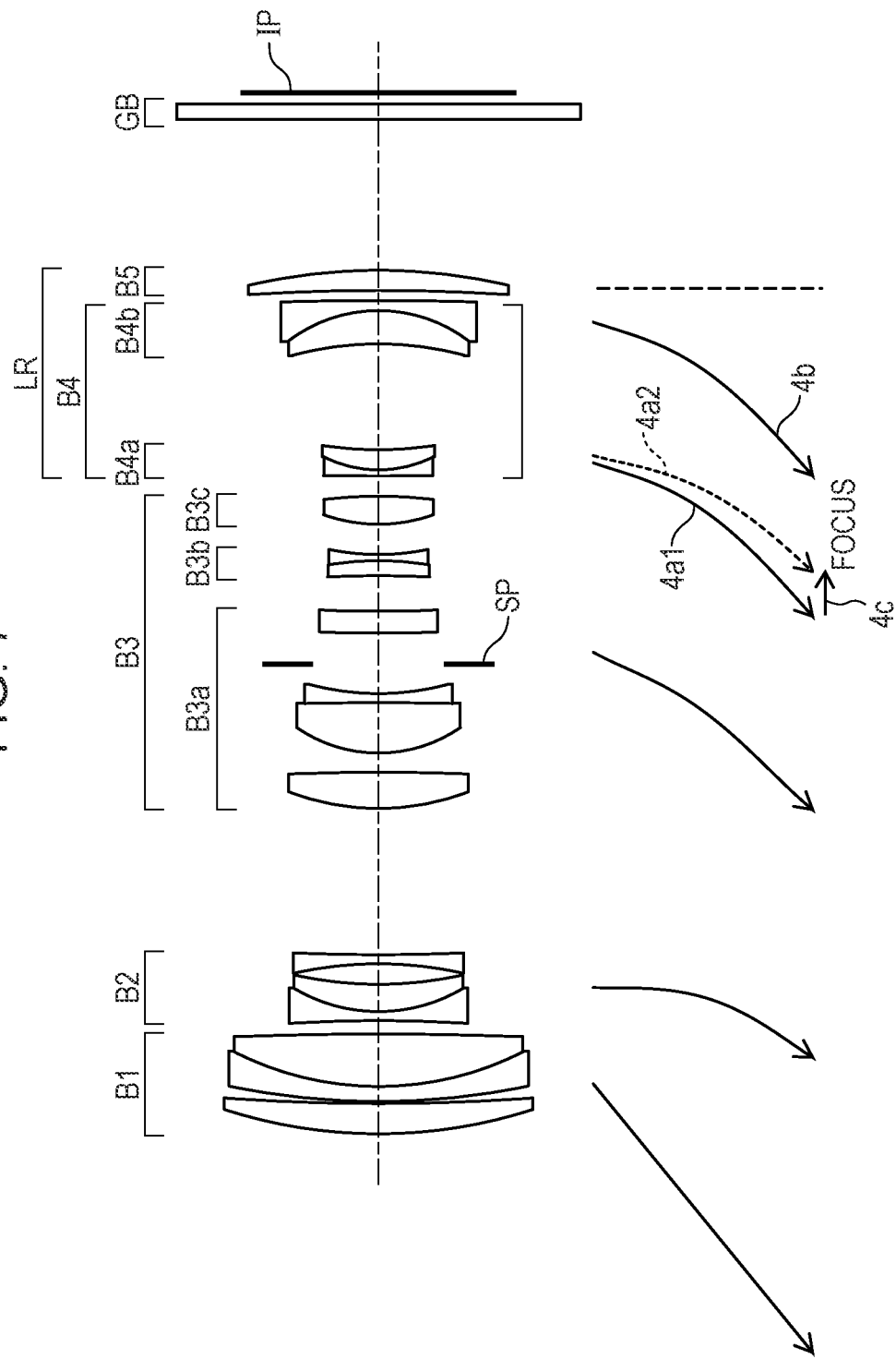

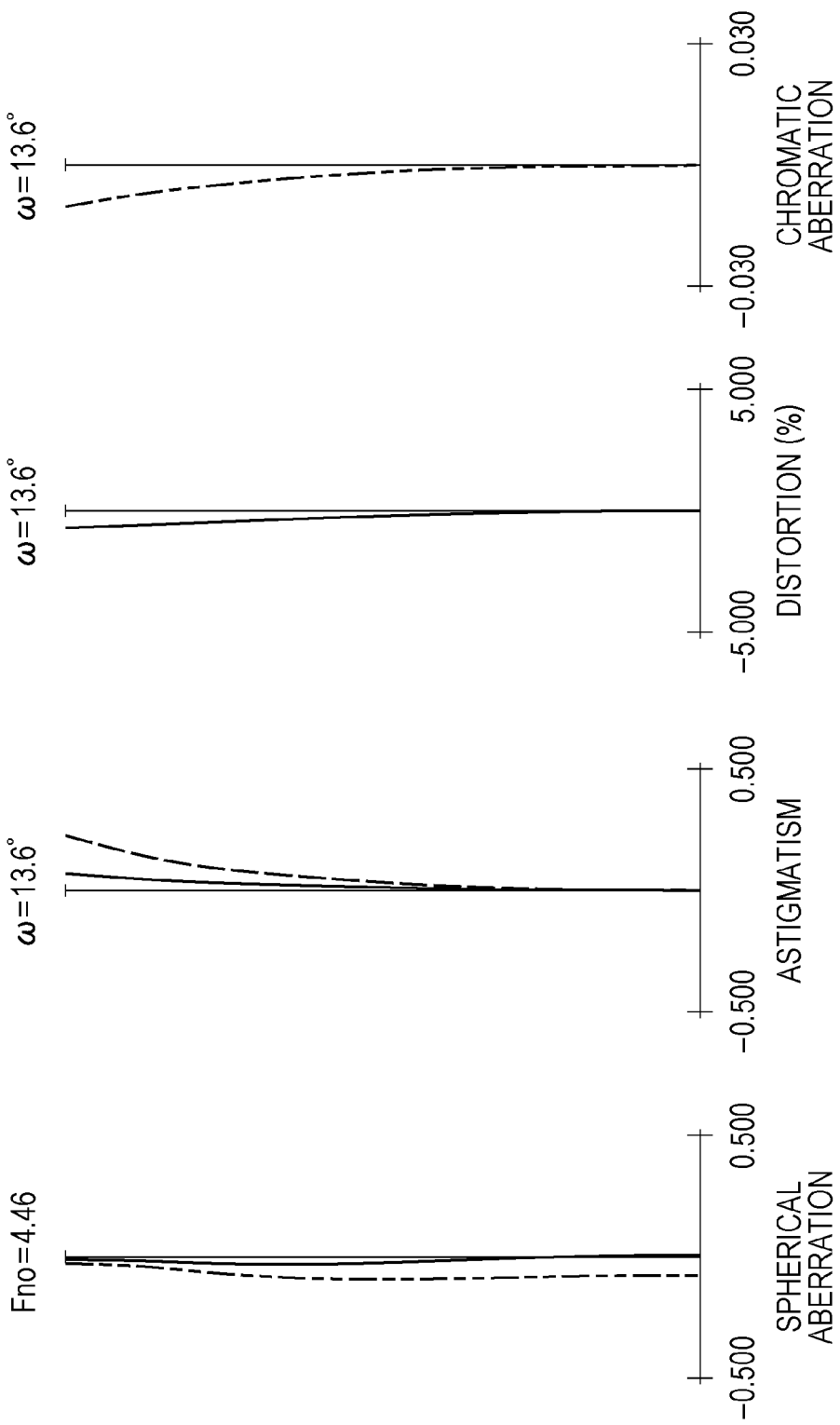

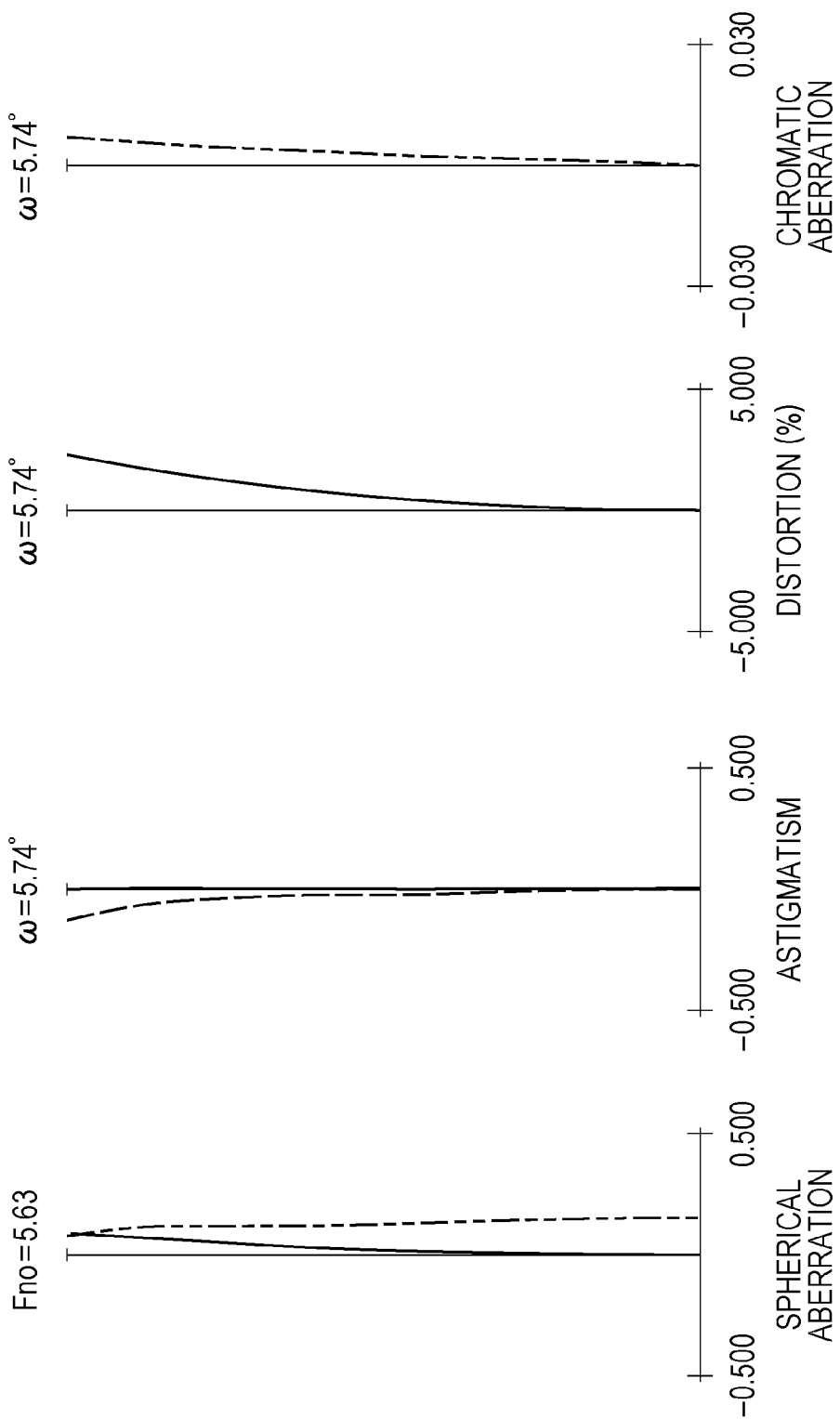

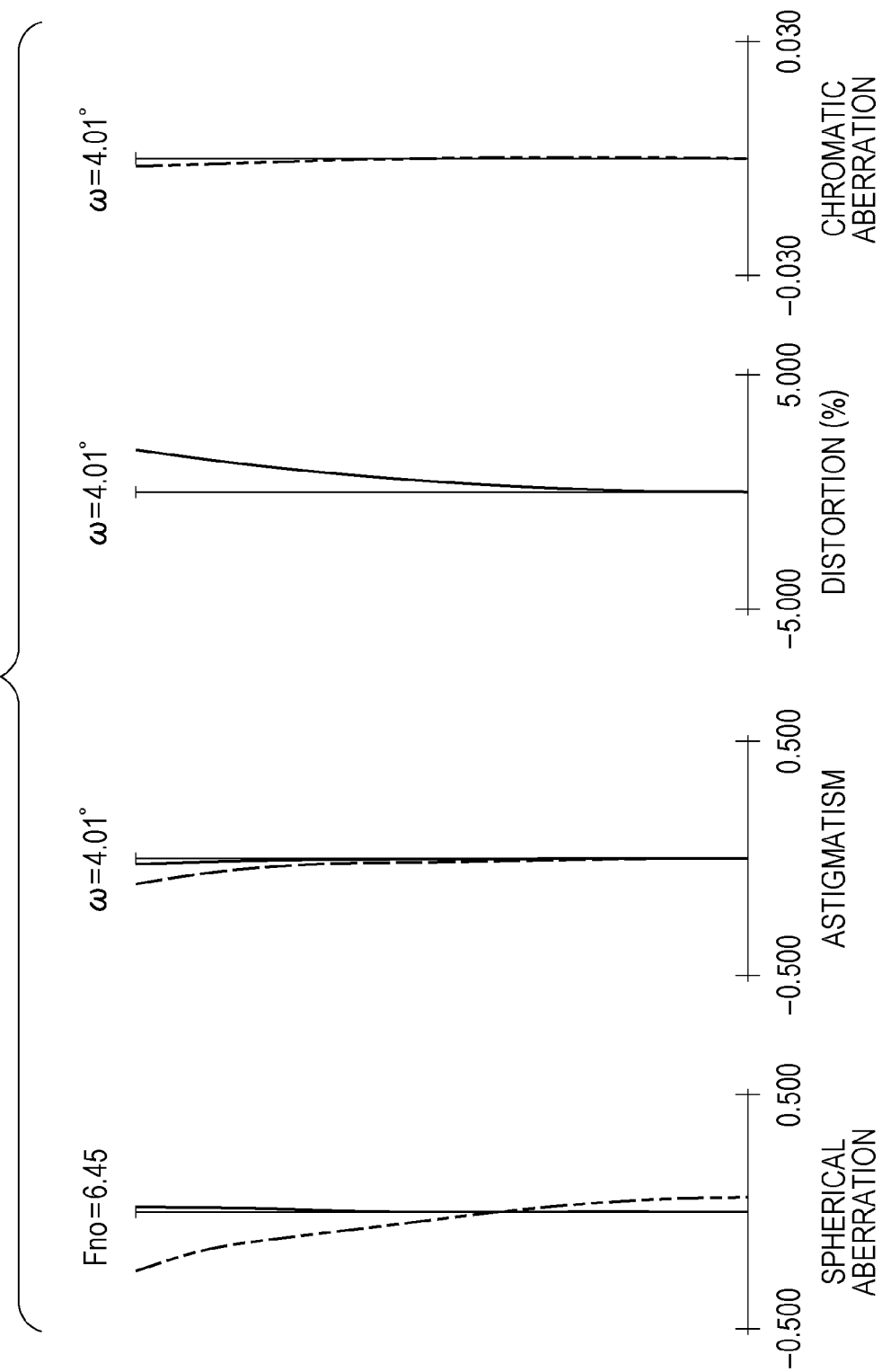

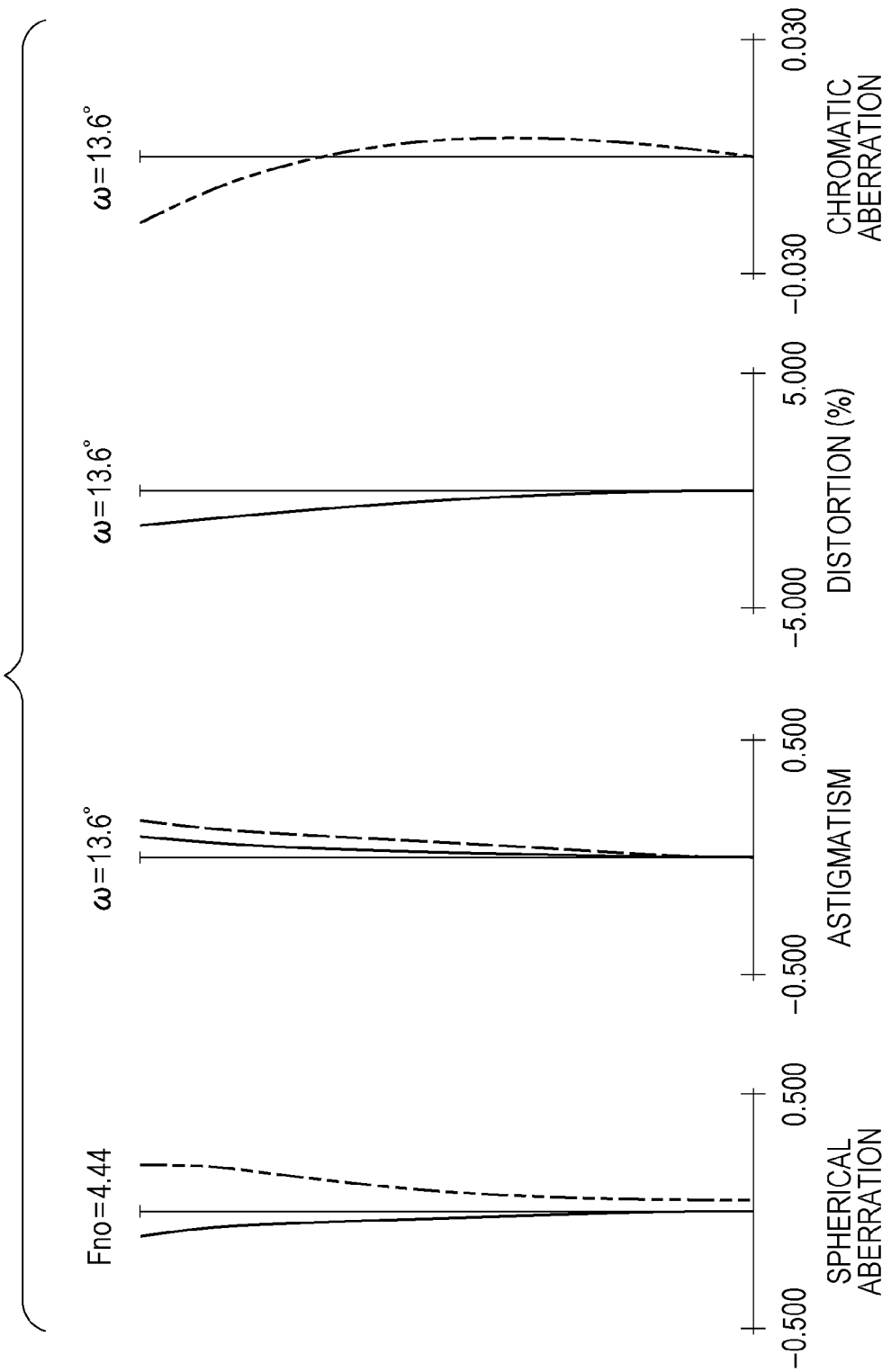

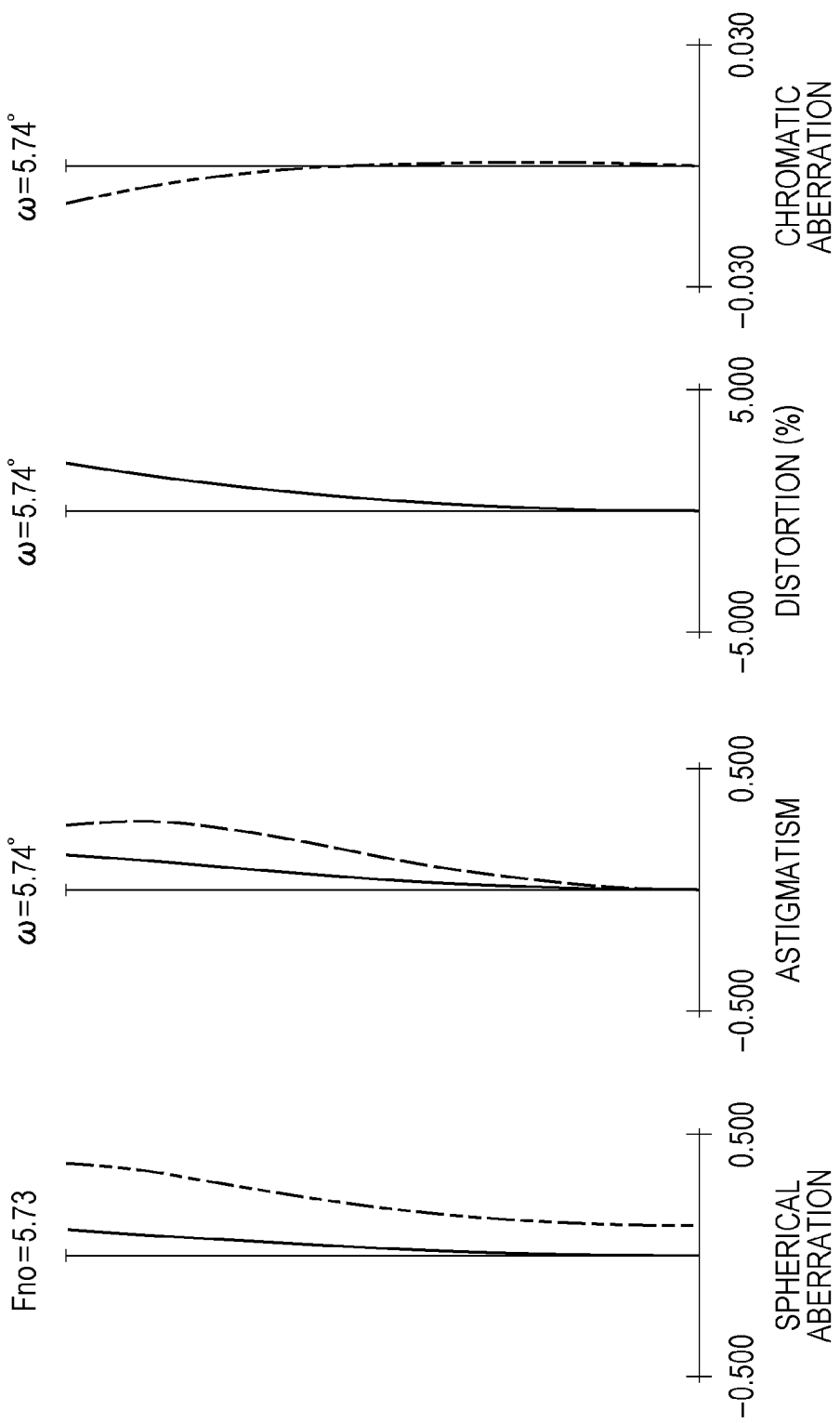

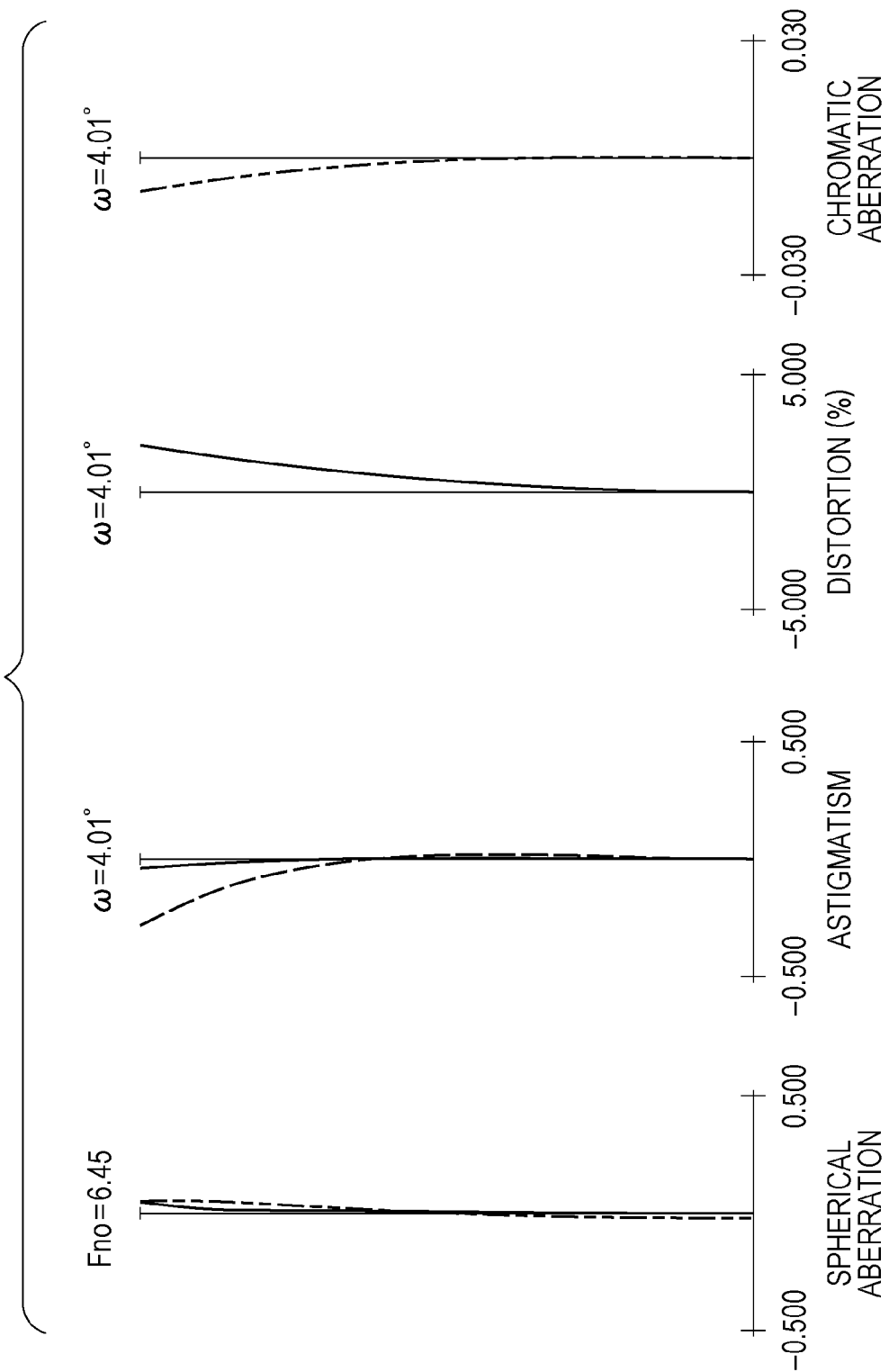

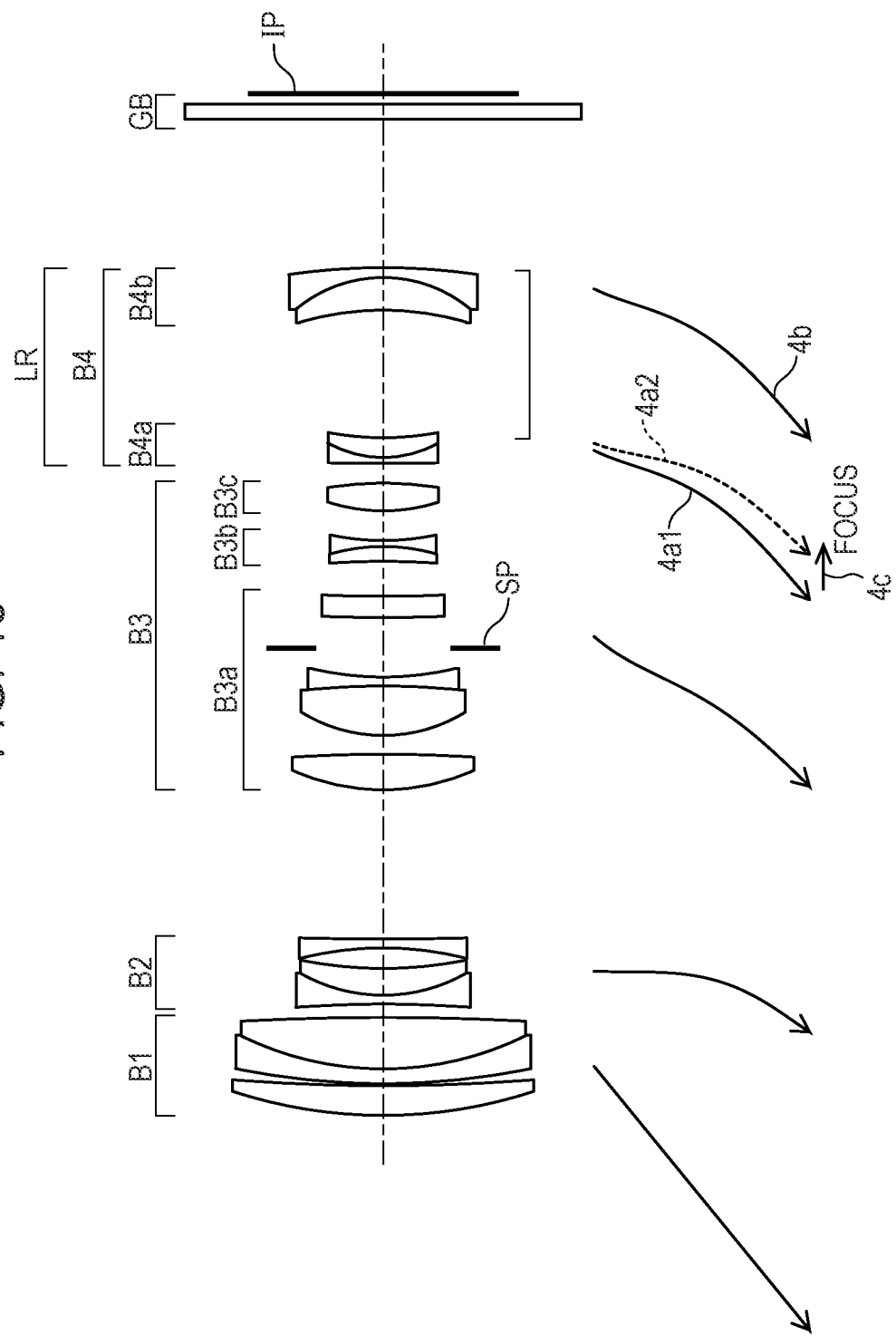

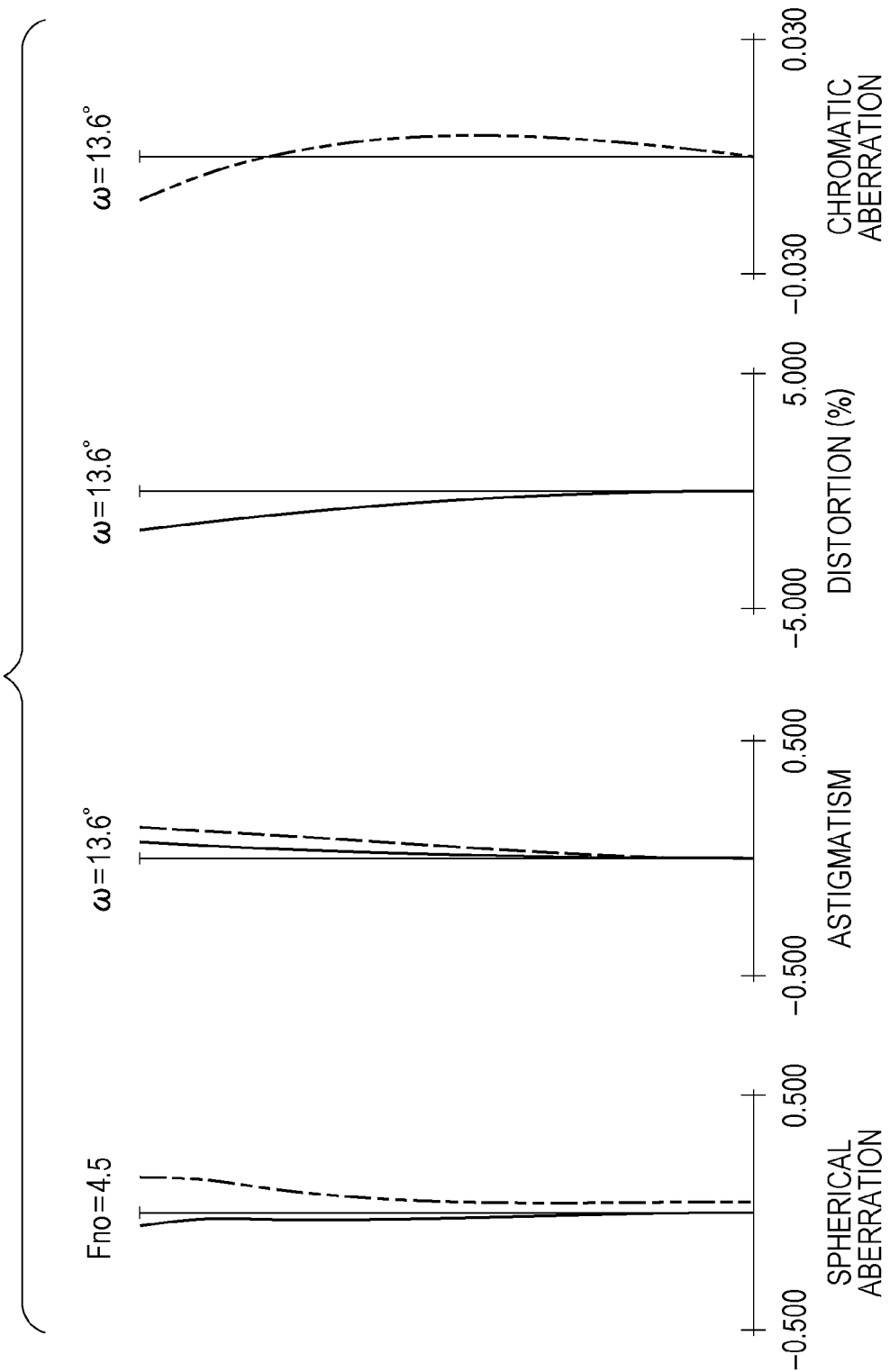

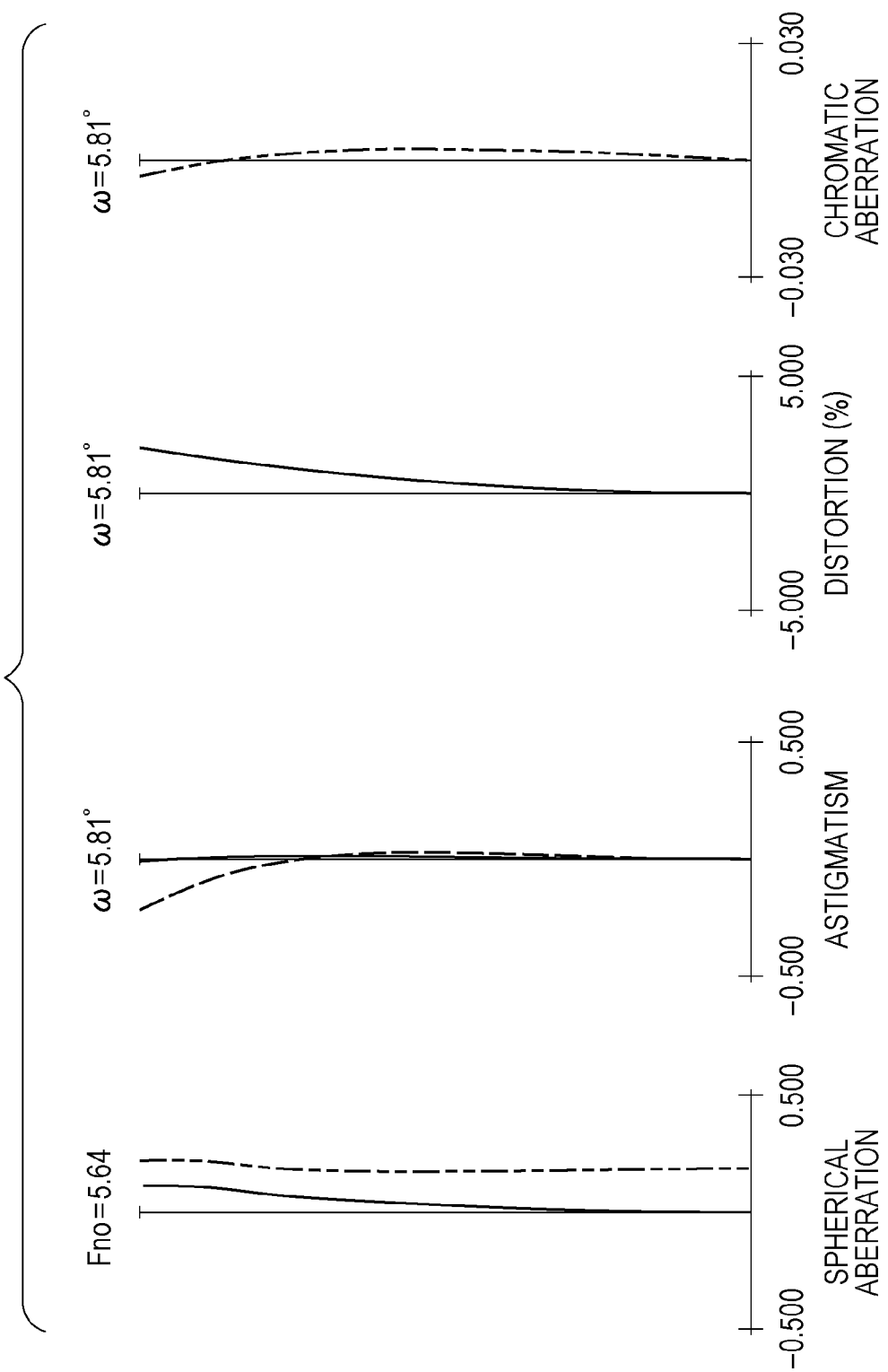

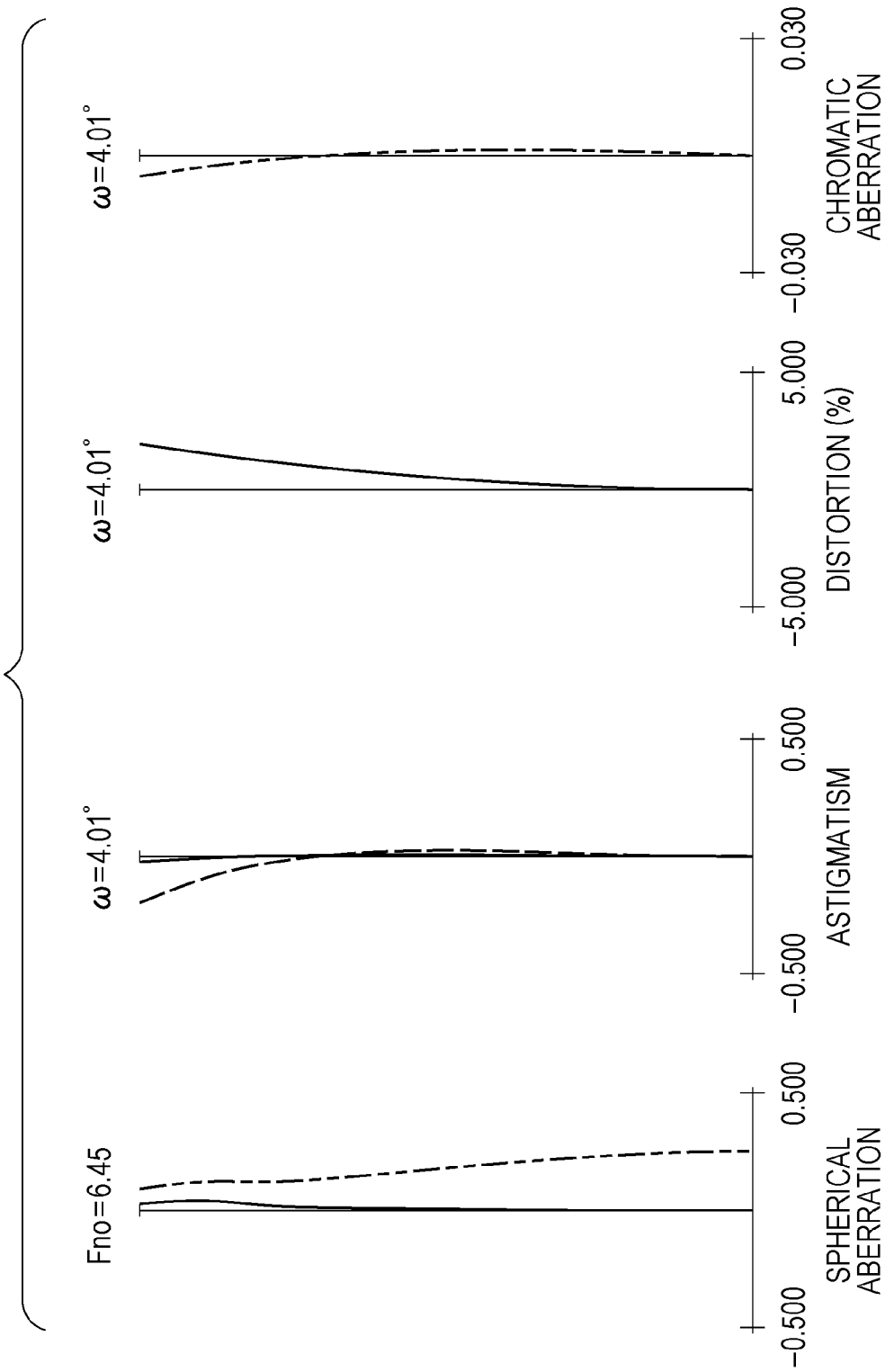

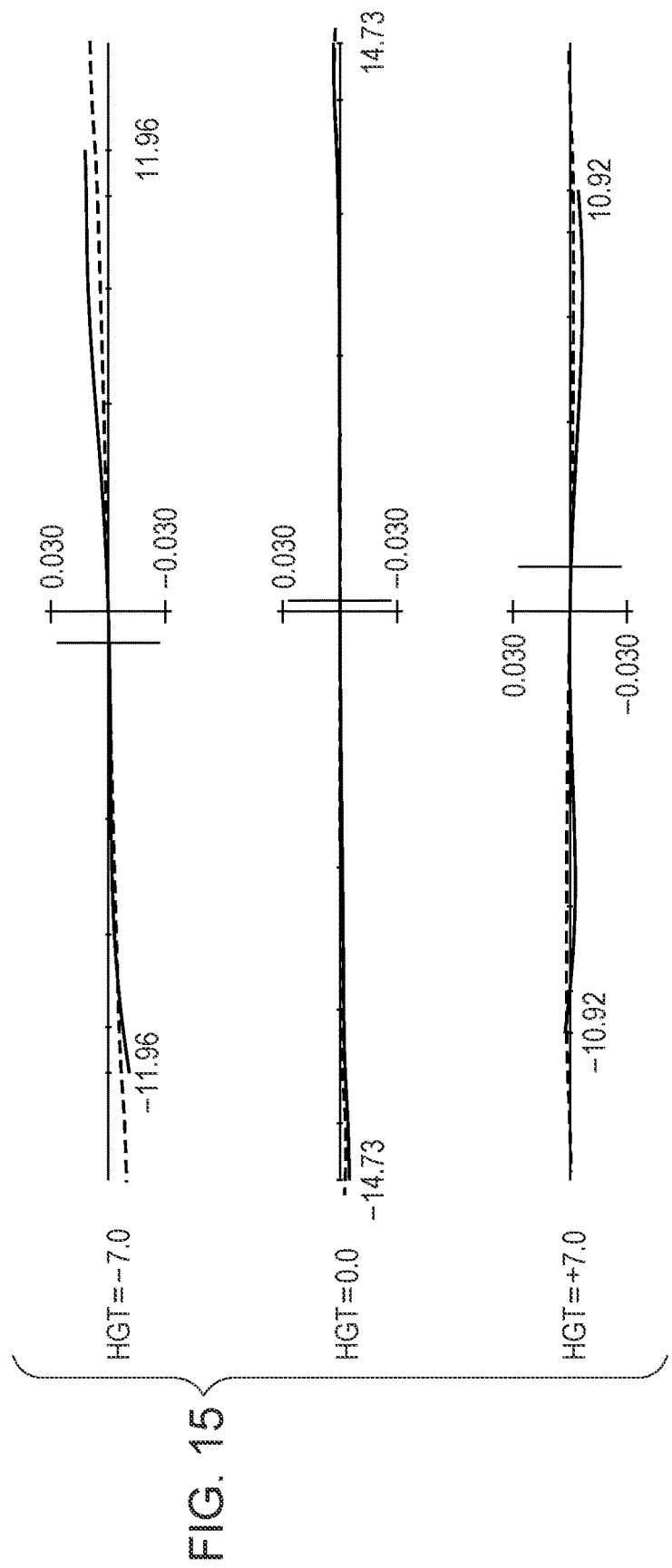

ZOOM LENS AND IMAGE PICKUP APPARATUS INCLUDING ZOOM LENS

BACKGROUND OF THE INVENTION

Field of the Invention

The present invention relates to a zoom lens and an image pickup apparatus including the lens, which is suitable as an imaging optical system, such as, for example, a still camera, video camera, digital still camera, broadcasting camera, monitoring camera, or the like.

Description of the Related Art

There is demand for an imaging optical system used as an image pickup apparatus to be small in size, to have high optical performance across the entire zoom range with a high zoom ratio, and to include an image stabilizing mechanism.

There has been known a zoom lens including, in the order from the object side to the image side, a first lens unit having positive refractive power, a second lens unit having negative refractive power, a third lens unit having positive refractive power, and a fourth lens unit having positive refractive power, which is configured to correct image blurring by moving a portion of the third lens unit in a direction perpendicular to the optical axis.

The zoom lenses disclosed in Japanese Patent Laid-Open No. 2011-170086 and U.S. Pat. No. 7,692,862 are configured including a third A lens component having positive refractive power, a third B lens component having negative refractive power, and a third C lens component having positive refractive power, which move the third B lens component in a direction perpendicular to the optical axis at the time of image blurring correction.

SUMMARY OF THE INVENTION

A zoom lens according to an embodiment of the present invention is a zoom lens including, in the order from the object side to the image side, a first lens unit having positive refractive power; a second lens unit having negative refractive power; a third lens unit having positive refractive power; and a rear lens group including one or more lens units. Three or more lens units move so as to change an interval between adjacent lens units at the time of zooming. The third lens unit includes, in the order from the object side to the image side, a first lens subunit having positive refractive power, a second lens subunit having negative refractive power, and a third lens subunit having positive refractive power. The second lens subunit moves in a direction having a component perpendicular to the optical axis regarding image blurring correction. The focal length of the zoom lens at the telephoto end is ft and the focal length of the third lens unit is f3. When the zoom lens zooms to the telephoto end, a conditional expression $$5.0 < ft/f3 < 10.0$$

is satisfied.

Further features of the present invention will become apparent from the following description of exemplary embodiments with reference to the attached drawings.

BRIEF DESCRIPTION OF THE DRAWINGS

FIG. 1 is a lens cross-sectional view at the wide angle end of a zoom lens according to a first embodiment.

FIGS. 2A to 2C are longitudinal-aberration charts of the zoom lens according to the first embodiment.

FIG. 3 is a lateral-aberration chart at the time of image stabilization of the zoom lens according to the first embodiment.

FIG. 4 is a lens cross-sectional view at the wide angle end of a zoom lens according to a second embodiment.

FIGS. 5A to 5C are longitudinal-aberration charts of the zoom lens according to the second embodiment.

FIG. 7 is a lens cross-sectional view at the wide angle end of a zoom lens according to a third embodiment.

FIGS. 8A to 8C are longitudinal-aberration charts of the zoom lens according to the third embodiment.

FIGS. 11A to 11C are longitudinal-aberration charts of the zoom lens according to the fourth embodiment.

FIG. 13 is a lens cross-sectional view at the wide angle end of a zoom lens according to a fifth embodiment.

FIGS. 14A to 14C are longitudinal-aberration charts of the zoom lens according to the fifth embodiment.

FIG. 15 is a lateral-aberration chart at the time of image stabilization of the zoom lens according to the fifth embodiment.

DESCRIPTION OF THE EMBODIMENTS

Hereinafter, description will be made regarding embodiments of the present invention relating to a zoom lens and an image pickup apparatus including this lens. A zoom lens according to at least one embodiment of the present invention includes, in the order from the object side to the image side, a first lens unit having positive refractive power, a second lens unit having negative refractive power, a third lens unit having positive refractive power, and a rear lens group including one or more lens units. Three or more lens units move so as to change an internal between adjacent lens units at the time of zooming.

The third lens unit is, in the order from the object side to the image side, configured including a first lens subunit having positive refractive power, a second lens subunit having negative refractive power, and a third lens subunit having positive refractive power. The second lens subunit moves in a direction having a component perpendicular to the optical axis at the time of image blurring correction. Here, the second lens subunit is an image stabilizing lens subunit having an image stabilization function.

FIG. 1 is a lens cross-sectional view at the wide angle end of a zoom lens according to a first embodiment. FIGS. 2A, 2B, and 2C are aberration charts of the zoom lens, respectively, at the wide angle end (short focal length end), at an intermediate zoom position, and at the telephoto end (long focal length end), when focusing on an infinitely-distant object, according to the first embodiment. FIG. 3 is a lateral-aberration chart when performing image blurring correction with 0.3 degrees at the telephoto end according to the first embodiment. The first embodiment is a zoom lens with a zoom ratio of 3.45, and an F-number of 4.50 to 6.45.

Figure 6:
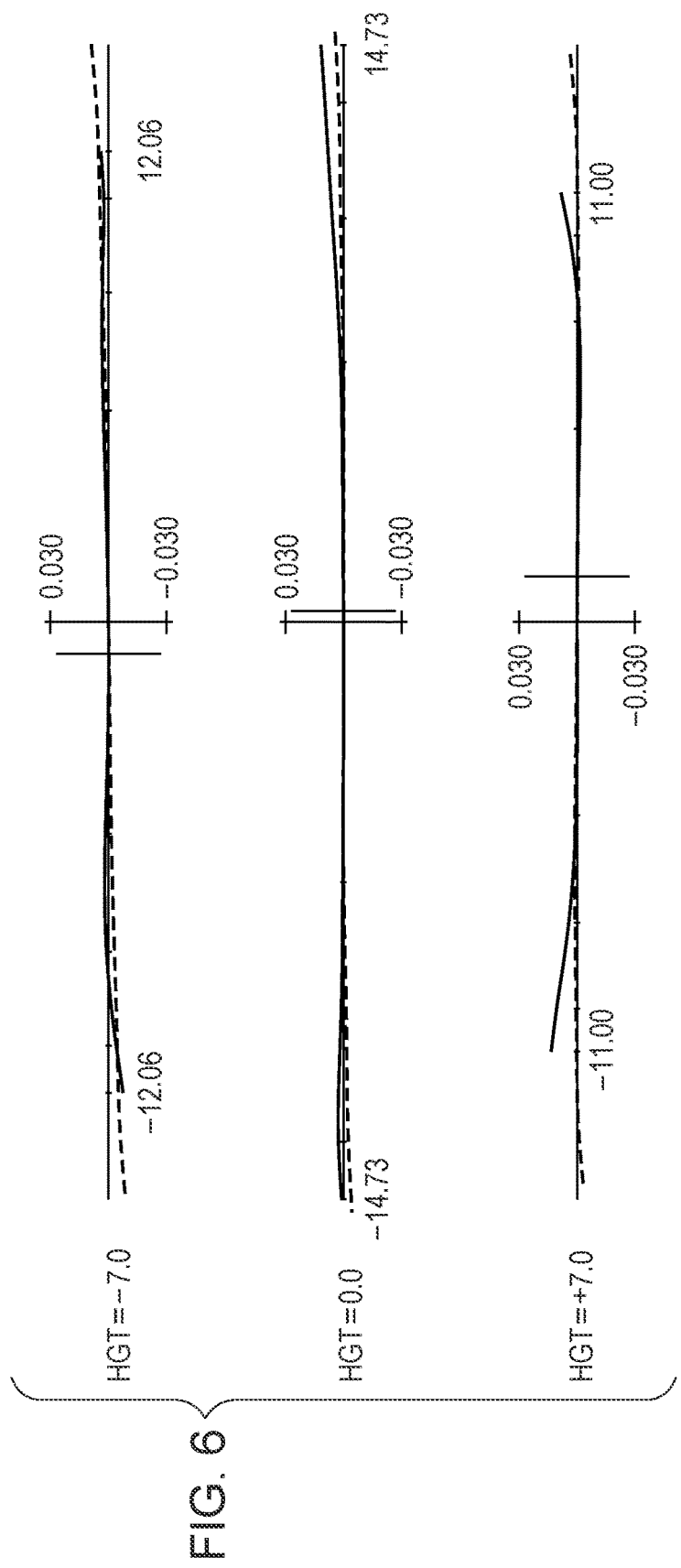
FIG. 6 is a lateral-aberration chart at the time of image stabilization of the zoom lens according to the second embodiment.

FIG. 4 is a lens cross-sectional view at the wide angle end of a zoom lens according to a second embodiment. FIGS. 5A, 5B, and 5C are aberration charts respectively at the wide angle end, an intermediate zoom position, and the telephoto end of the zoom lens, when focusing on an infinitely-distant object, according to the second embodiment. FIG. 6 is a lateral-aberration chart when performing image blurring correction with 0.3 degrees at the telephoto end according to the second embodiment. The second embodiment is a zoom lens with a zoom ratio of 3.45, and an F-number of 4.50 to 6.45.

Figure 9:
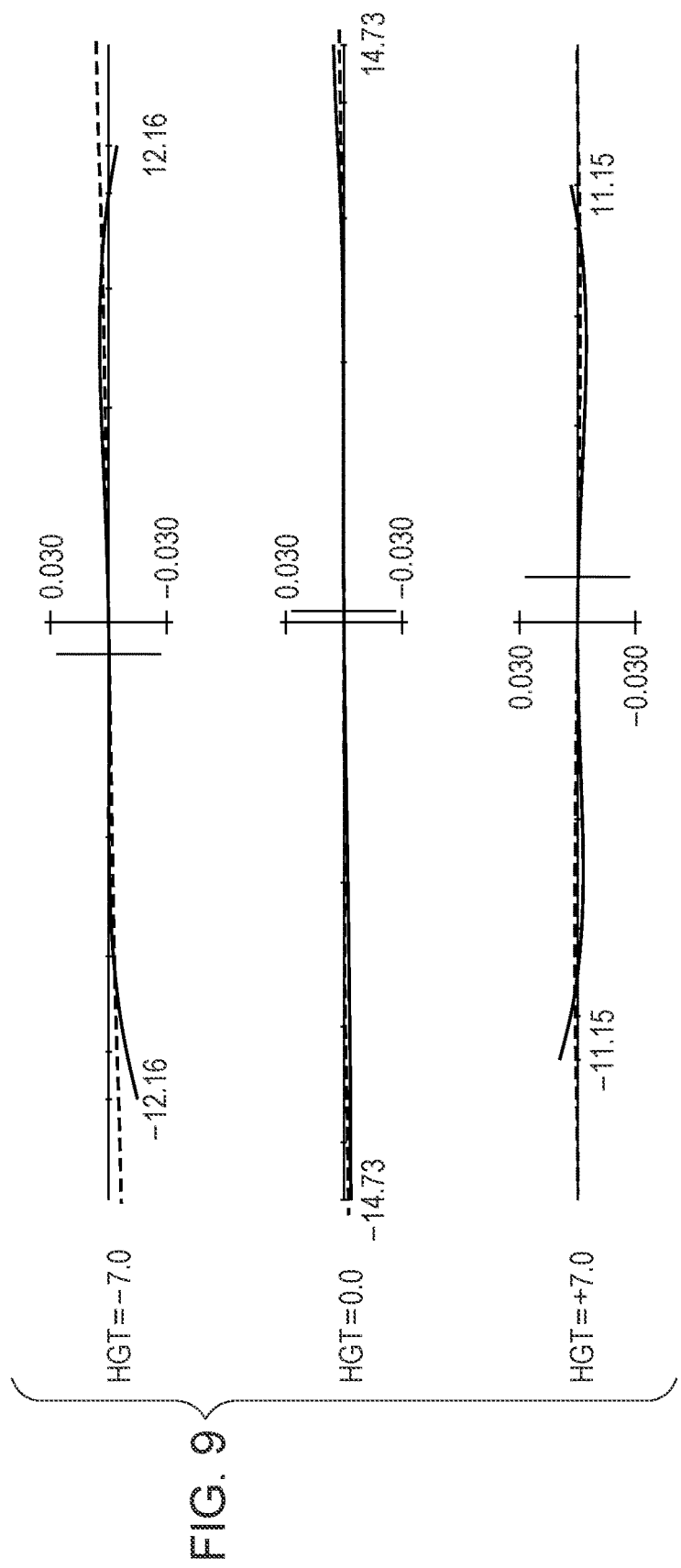
FIG. 9 is a lateral-aberration chart at the time of image stabilization of the zoom lens according to the third embodiment.

FIG. 7 is a lens cross-sectional view at the wide angle end of a zoom lens according to a third embodiment. FIGS. 8A, 8B, and 8C are aberration charts at the wide angle end, an intermediate zoom position, and the telephoto end of the zoom lens, when focusing on an infinitely-distant object, according to the third embodiment. FIG. 9 is a lateral-aberration chart when performing image blurring correction with 0.3 degrees at the telephoto end according to the third embodiment. The third embodiment is a zoom lens with a zoom ratio of 3.45, and an F-number of 4.46 to 6.45.

Figure 10:
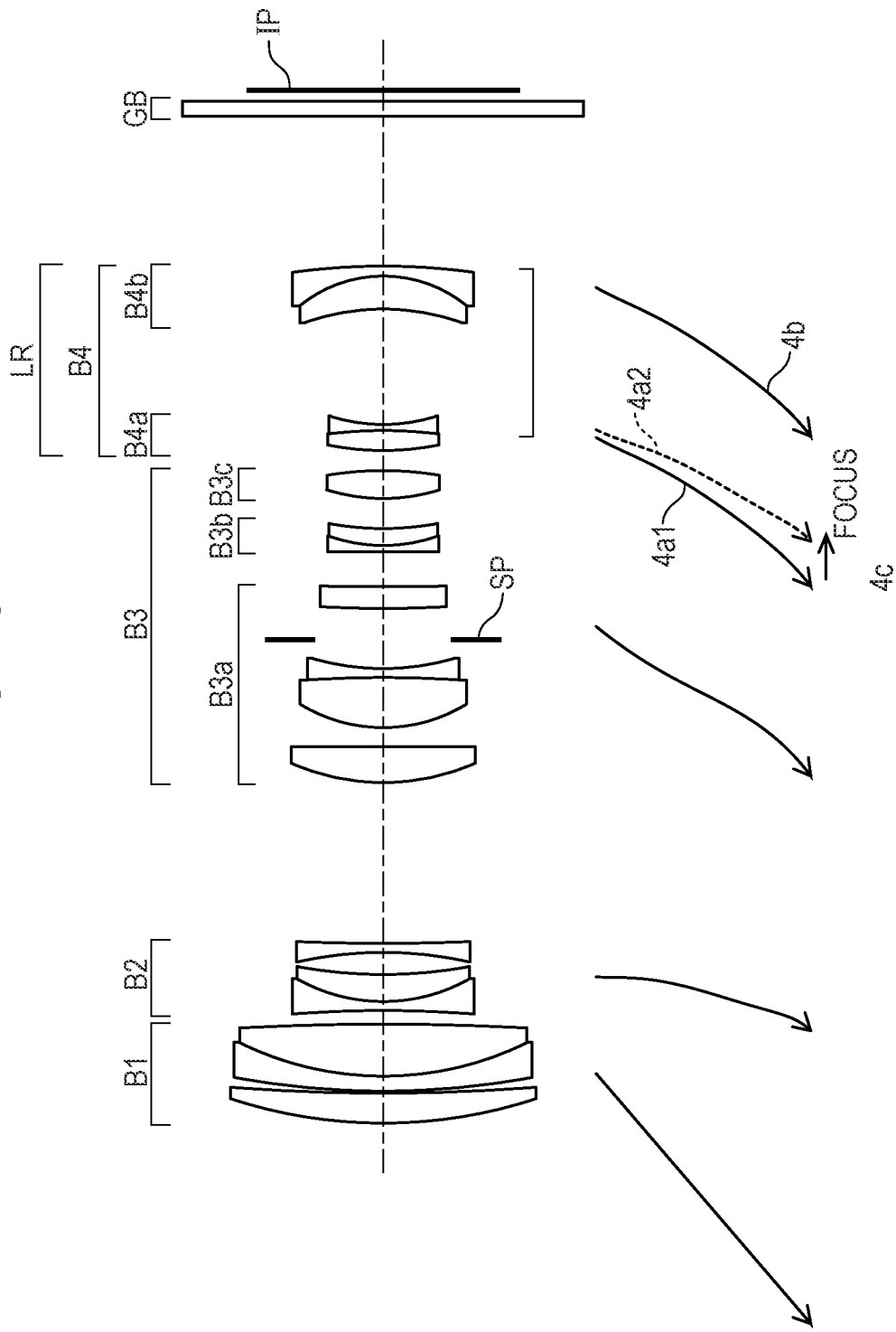
FIG. 10 is a cross-sectional view at the wide angle end of a zoom lens according to a fourth embodiment.
Figure 12:
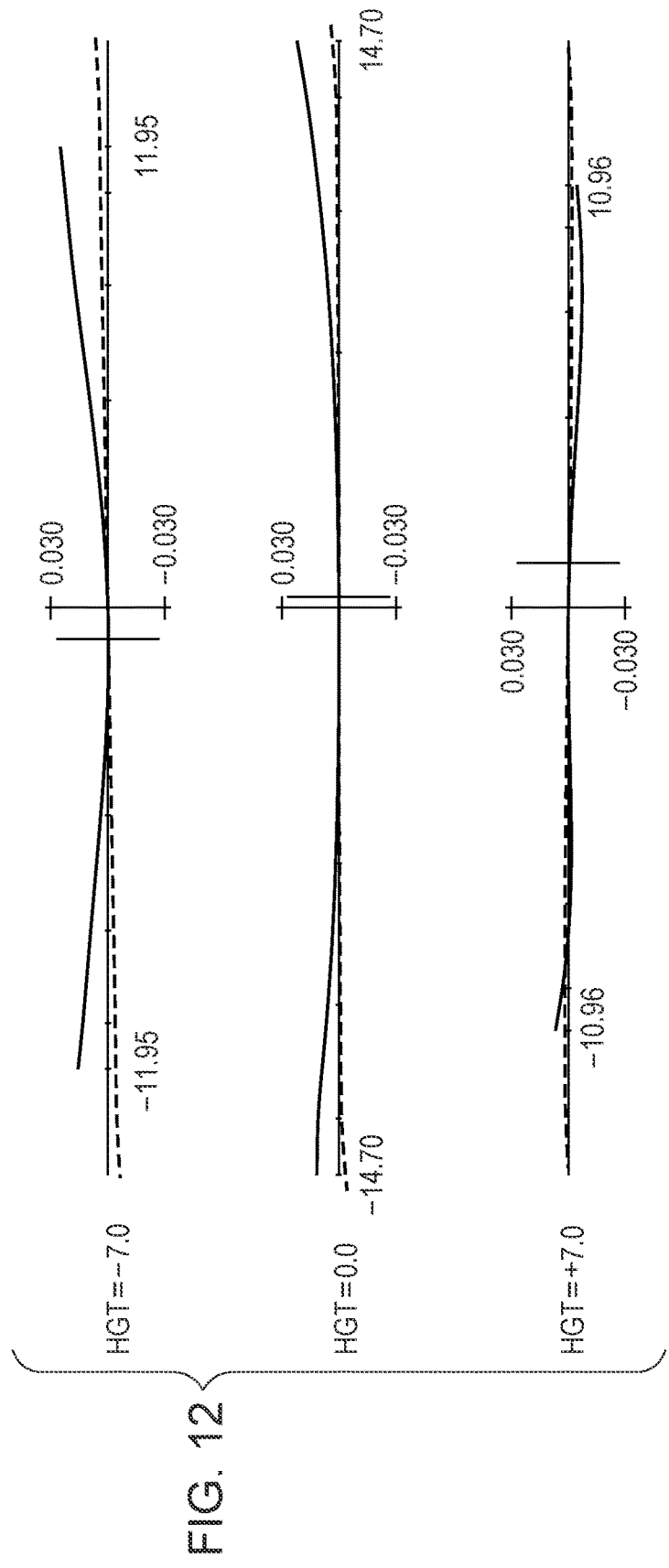
FIG. 12 is a lateral-aberration chart at the time of the image stabilization of zoom lens according to the fourth embodiment.

FIG. 10 is a lens cross-sectional view at the wide angle end of a zoom lens according to a fourth embodiment. FIGS. 11A, 11B, and 11C are aberration charts at the wide angle end, an intermediate zoom position, and the telephoto end of the zoom lens, when focusing on an infinitely-distant object, according to the fourth embodiment. FIG. 12 is a lateral-aberration chart when performing image blurring correction with 0.3 degrees at the telephoto end according to the fourth embodiment. The fourth embodiment is a zoom lens with a zoom ratio of 3.45, and an F-number of 4.44 to 6.45.

Figure 16:
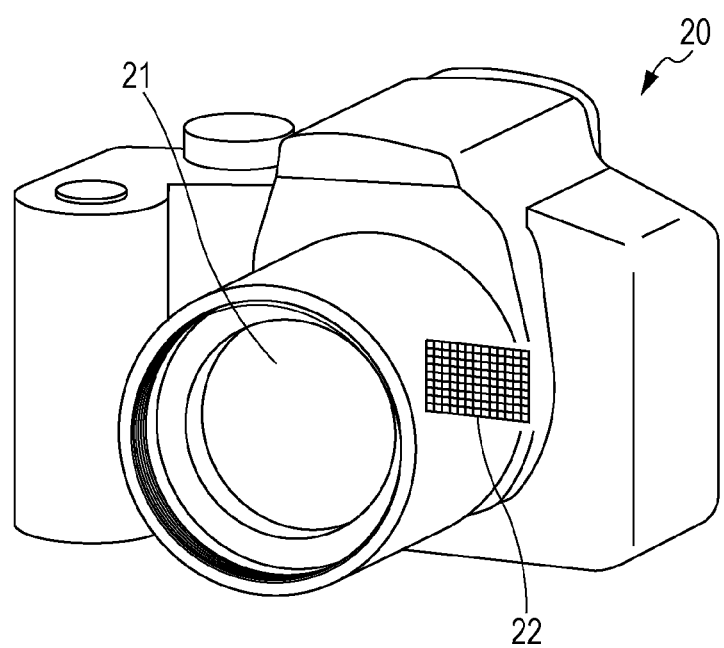
FIG. 16 is a schematic view of an image pickup apparatus according to an embodiment of the present invention.

FIG. 13 is a lens cross-sectional view at the wide angle end of a zoom lens according to a fifth embodiment. FIGS. 14A, 14B, and 14C are aberration charts at the wide angle end, an intermediate zoom position, and the telephoto end of the zoom lens, when focusing on an infinitely-distant object, according to the fifth embodiment. FIG. 15 is a lateral-aberration chart when performing image blurring correction with 0.3 degrees at the telephoto end according to the fifth embodiment. The fifth embodiment is a zoom lens with a zoom ratio of 3.45, and an F-number of 4.50 to 6.45. FIG. 16 is a principal part schematic view of a video camera (image pickup apparatus) including a zoom lens according to an embodiment of the present invention.

In the lens cross-sectional views the left-hand side of the image (bottom of page) is considered the object side, and the right-hand side of the image (top of page) is considered the image side. Therefore, in order from the object side to the image side, B1 denotes a first lens unit having positive refractive power (optical power is the reciprocal of focal length), B2 denotes a second lens unit having negative refractive power, B3 denotes a third lens unit having positive refractive power, and LR denotes a rear lens group including one or more lens units. The rear lens group LR in the first, second, fourth, and fifth embodiments in FIGS. 1, 4, 10, and 13 is configured including a fourth lens unit B4 having negative refractive power. The rear lens group LR in the third embodiment in FIG. 7 is configured including the fourth lens unit B4 having negative refractive power and the fifth lens unit B5 having positive refractive power.

The lens units in the embodiments are lens portions divided with an interval in the optical axis direction that changes at the time of zooming. The third lens unit B3 includes a first lens subunit B3a having positive refractive power, a second lens subunit B3b having negative refractive power, and a third lens subunit B3c having positive refractive power. The embodiments correct image blurring, that is, perform image stabilization by moving the second lens subunit B3b in a direction with a component perpendicular to the optical axis.

Note that swinging motion (rotational movement) on a certain point on the optical axis with the rotation center may also be employed as movement for image stabilization. Moving the second lens subunit B3b for image stabilization in a direction having a component perpendicular to the optical axis enables movement within the plane of the image. The fourth lens unit B4 includes, with the widest air interval as a border, a fourth A lens subunit B4a having negative refractive power, and a fourth B lens subunit Bob having negative refractive power.

GB denotes an optical block equivalent to an optical filter, face plate, and so forth. IP denotes an image plane. When employing a zoom lens as an imaging optical system such as a video camera or digital still camera, the image sensing surface of an image pickup element (photoelectric conversion element) such as a CCD sensor, CMOS sensor, or the like is equivalent to the film surface of a silver-halide-film camera. SP denotes an aperture diaphragm configured to restrict a full aperture F-number light flux, which is provided in the first lens subunit B3a.

In spherical-aberration charts, a solid line denotes a d-line, and a two-dot dashed line denotes a g-line. In astigmatism-aberration charts, a broken line denotes a meridional image plane, and a solid line denotes a sagittal image plane. Magnification chromatic aberration is represented with a g-line. Fno denotes an F-number, and ω denotes a half field angle (degree). In lateral-aberration charts, moving distance in the vertical direction at the time of image stabilization of the second lens subunit B3b indicates when moving the second lens subunit B3b by amount equivalent to correction amount at the time of occurrence of blurring with 0.3 degrees at the image pickup apparatus. In lateral-aberration charts, a numeric value indicated by HGT is equivalent to off-axis image height, +7 mm is equivalent to the upper side in the charts, and −7 mm is equivalent to the lower side in the charts. The lateral-aberration chart is represented by a d-line.

In lateral-aberration charts, a solid line denotes the meridional direction, and a dotted line denotes the sagittal direction. Note that zoom positions at the wide angle and telephoto end in the following embodiments are mechanical zoom positions when a lens unit for magnification is positioned in both ends in a movable range on the optical axis.

Next, the lens configuration of each embodiment will be described. In the lens cross-sectional views of the first and fourth embodiments in FIGS. 1 and 10, B1 denotes a first lens unit having positive refractive power, B2 denotes a second lens unit having negative refractive power, B3 denotes a third lens unit having positive refractive power, and B4 denotes a fourth lens unit having negative refractive power. The third lens unit B3 includes a first lens subunit B3a having positive refractive power, a second lens subunit B3b having negative refractive power, and a third lens subunit B3c having positive refractive power. Image blurring is corrected by moving the second lens subunit B3b in a direction having a component perpendicular to the optical axis. That is to say, the second lens subunit B3b is an image stabilizing lens subunit having an image stabilization function.

The fourth lens unit B4 includes, with the widest air interval as a border, a fourth A lens subunit B4a having negative refractive power, and a fourth B lens subunit Bob having negative refractive power. When focusing on infinity, the lens units move with a movement locus indicated by a solid-line arrow at the time of zooming from the wide angle end to telephoto end. Specifically, the first lens unit B1, second lens unit B2, third lens unit B3, and fourth lens unit B4 move to the object side so as to change an interval between adjacent lens units at the time of zooming.

The fourth A lens subunit B4a moves with a movement locus 4a1, and the fourth B lens subunit B0b moves with a movement locus 4b, which make up the fourth lens unit B4. Here, the movement locus 4a1 and movement locus 4b are the same locus. Thus, though the zoom lens is small in size, a sufficient zoom ratio and high optical performance are obtained. When focusing on from infinity to near distance, the fourth A lens subunit B4a moves to the image side such as illustrated by an arrow 4c. When focusing on near distance, the fourth A lens subunit B4a moves to the object side such as a movement locus 4a2 illustrated by a dotted line at the time of zooming from the wide angle end to the telephoto end.

The number of the lens units and the refractive power of each lens unit of the zoom lens according to the second embodiment in FIG. 4 are the same as those in the first embodiment. The lens configuration of the third lens unit B3 and the lens configuration of the fourth lens unit B4 are also the same as those in the first embodiment. The second embodiment differs from the first embodiment in that the second lens unit B2 does not move at the time of zooming.

The first lens unit B1, third lens unit B3, and fourth lens unit B4 are moved at the time of zooming in the second embodiment though the second lens unit B2 is not moved, whereby a sufficient zoom ratio and high optical performance are obtained even though the zoom lens is small in size. A configuration regarding focusing is the same as that in the first embodiment. Moving conditions of the fourth A lens subunit B4a and fourth B lens subunit B0b which make up the fourth lens unit B4 at the time of zooming are the same as those in the first embodiment.

In the lens cross-sectional view of the third embodiment in FIG. 7, B1 denotes a first lens unit having positive refractive power, B2 denotes a second lens unit having negative refractive power, B3 denotes a third lens unit having positive refractive power, B4 denotes a fourth lens unit having negative refractive power, and B5 denotes a fifth lens unit having positive refractive power. The lens configuration of the third lens unit B3 and a configuration for performing image blurring correction at the second lens subunit B3b are the same as those in the first embodiment. The lens configuration of the fourth lens unit B4 and a configuration for focusing at the fourth A lens subunit B4a are also the same as those in the first embodiment. The fifth lens unit B5 includes one positive lens.

When focusing on infinity, the first lens unit B1 to fourth lens unit B4 move with a movement locus illustrated with a solid-line arrow at the time of zooming from the wide angle end to the telephoto end. The fifth lens unit B5 does not move at the time of zooming. Moving the first lens unit B1, second lens unit B2, third lens unit B3, and fourth lens unit B4 along the optical axis enables a sufficient zoom ratio and high optical performance to be obtained, though the zoom lens is small in size. A configuration regarding focusing is the same as that in the first embodiment. Moving conditions of the fourth A lens subunit B4a and fourth B lens subunit B0b which make up the fourth lens unit B4 at the time of zooming are the same as those in the first embodiment.

In the lens cross-sectional view of the fifth embodiment in FIG. 13, B1 denotes a first lens unit having positive refractive power, B2 denotes a second lens unit having negative refractive power, B3 denotes a third lens unit having positive refractive power, and B4 denotes a fourth lens unit having negative refractive power. The lens configuration of the third lens unit B3 and a configuration for performing image blurring correction at the second lens subunit B3b are the same as those in the first embodiment. The fourth lens unit B4 includes, with the widest air interval as a border, a fourth A lens subunit B4a having negative refractive power, and a fourth B lens subunit B0b having positive refractive power.

Specifically, the first lens unit B1, second lens unit B2, third lens unit B3, and fourth lens unit B4 move so as to change an interval between adjacent lens units at the time of zooming. Thus, though the zoom lens is small in size, a sufficient zoom ratio and high optical performance are obtained. A configuration regarding focusing is the same as that in the first embodiment. Moving conditions of the fourth A lens subunit B4a and fourth B lens subunit B0b which make up the fourth lens unit B4 at the time of zooming are the same as those in the first embodiment.

The zoom lens according to an embodiment of the present invention includes the following in order to suitably perform correction of various aberrations while securing a sufficient zoom ratio though the zoom lens is small in size. There are provided, from the object side toward the image side, the first lens unit B1 having positive refractive power, the second lens unit B2 having negative refractive power, the third lens unit B3 having positive refractive power, and the rear lens group including one or more lens units. Performing image blurring correction (image stabilization) at some lens units making up the third lens unit B3 realizes reduction in size of the lens unit for image blurring correction and reduction in size of the zoom lens, even though high optical performance is obtained.

The first lens subunit B3a having positive refractive power is disposed closest to the object side of the third lens unit B3, on-axis light flux closer to the image side than the first lens subunit B3a are converged to reduce the incident heights thereof and also to reduce the incident height of off-axis light flux. At this time, of the zoom lens, the lens effective diameter of the lens unit on the image side of the first lens subunit B3a relatively decreases.

Therefore, reduction in size of the lens unit for image blurring correction is realized so as to move the second lens subunit B3b closer to the object side than the first lens subunit B3a in a direction having a component perpendicular to the optical axis for image blurring correction. Also, the second lens subunit B3b is made to have negative refractive power, the third C lens subunit B3c having positive refractive power is disposed on the image side of the second lens subunit B3b, and aberration correction is suitably performed while making it easier for the negative refractive power of the second lens subunit B3b to be set to a desired value suitable for image blurring correction.

As described above, the zoom lens according to an embodiment of the present invention is, with the third lens B3 as a whole, configured including, in the order from the object side to the image side, the first lens subunit B3a having positive refractive power, the second lens subunit B3b having negative refractive power, and the third lens subunit B3c having positive refractive power. Thus, the inside of the third lens unit B3 becomes a symmetric distribution of refractive power combined from a converging lens subunit and a diverging lens subunit, and particularly, aberration fluctuation due to zooming is effectively suppressed. Reduction in size of the zoom lens, and increase in a high zoom ratio are realized by moving at least three lens units onto the optical axis at the time of zooming.

When defining that the focal length of the third lens unit B3 is f3, and the focal length of the zoom lens at the telephoto end is ft in the embodiments, the following conditional expression (1) is satisfied.

$$5.0 < ft/f3 < 10.0 \quad (1)$$

The conditional expression (1) suitably defines a ratio of the focal length of the zoom lens at the telephoto end to the focal length of the third lens unit B3. Reducing the focal length of the third lens unit B3 to the point that the conditional expression (1) goes beyond the upper limit, increases the spherical aberration at the telephoto end. In this case, though a desired image stabilization advantage and zooming advantage are readily obtained, correction of spherical aberration is difficult. Increasing the focal length of the third lens unit B3 to the point that the condition expression (1) goes beyond the lower limit, reduces the effect of converging light rays (convergence) at the third lens unit B3, the effective diameter of the second lens subunit B3b increases in size, and a reduction in size of the second lens subunit B3b for image stabilization is difficult. In other words, it is generally not desirable that conditional expression (1) extend beyond its lower or upper limits.

As described above, according to the present invention, there is obtained a zoom lens in which the second lens subunit B3b for image stabilization is small in size and light in weight, and also, the zoom lens is small in size and has high performance and a sufficient zoom ratio. Thus, an image pickup apparatus having an image stabilization function while reducing the size of the zoom lens including the mechanical mechanism for image stabilization is readily obtained. It is further desirable to satisfy one or more of the following conditional expressions in the embodiments.

Let the focal length of the first lens subunit B3a be defined as f3a; the focal length of the second lens subunit B3b is f3b; and the focal length of the third lens subunit B3c is f3c. Further, the focal length of the first lens unit B1 is f1; and the focal length of the second lens unit B2 is f2. Further, a back focus at the wide angle end is skw; and the overall lens length at the telephoto end is TL. Here, the overall lens length is obtained by adding the back focus (air conversion distance from the final lens surface to the image plane) to distance from the first lens surface to the final lens surface. At this time, it is desirable to satisfy one or more of the following conditional expressions.

$$0.5 < f3a/|f3b| < 1.2 \quad (2)$$

$$0.6 < f3a/f3 < 1.3 \quad (3)$$

$$0.6 < |f3b|/f3 < 1.6 \quad (4)$$

$$0.08 < |f3b|/f3c < 1.40 \quad (5)$$

$$0.9 < f3/skw < 2.0 \quad (6)$$

$$0.6 < |f2|/skw < 2.0 \quad (7)$$

$$0.05 < |f2|/ft < 0.15 \quad (8)$$

$$0.2 < f1/ft < 0.8 \quad (9)$$

$$0.68 < TL/ft < 0.85 \quad (10)$$

Next, the technical merits of the above conditional expressions will be described. The conditional expression (2) suitably defines a ratio of the focal length of the first lens subunit B3a to the focal length of the second lens subunit B3b for image stabilization. Excessively increasing the focal length of the first lens subunit B3a to the point that conditional expression (2) extends beyond the upper limit thereof, the advantage of converging a light ray by the first lens subunit B3a is diminished, and the effective diameter of the second lens subunit B3b increases in size, which is undesirable. Excessively reducing the focal length of the first lens subunit B3a to the point that condition expression (2) extends beyond the lower limit thereof, increases the spherical aberration at the telephoto end though the advantage of converging light rays increases, and correction of spherical aberration is difficult.

The conditional expression (3) suitably defines a ratio of the focal length of the first lens subunit B3a to the focal length of the third lens unit B3. Excessively decreasing the focal length of the third lens unit B3, to the point that condition expression (3) extends beyond the upper limit thereof, increases the spherical aberration at the telephoto end. Excessively increasing the focal length of the third lens unit B3, to the point that conditional expression (3) extends beyond the lower limit thereof, makes obtaining the desired zooming ratio difficult. Also, the moving distance of the moving lens unit increases at the time of zooming, and the zoom lens is increased in size, which is also undesirable.

The conditional expression (4) suitably defines a ratio of the focal length of the second lens subunit B3b for image stabilization to the focal length of the third lens unit B3. Excessively increasing the absolute value of the focal length of the second lens subunit B3b, to the point that conditional expression (4) extends beyond the upper limit thereof, diminishes the advantage provided by the second lens subunit for image stabilization, the moving distance of the second lens subunit B3b at the time of image stabilization increases, and the second lens subunit B3b increases in size, which is undesirable. Excessively reducing the absolute value of the focal length of the second lens subunit B3b, to the point that conditional expression (4) extends beyond the lower limit thereof, may increase the advantage provided by the lens subunit for image stabilization, but fluctuation of various aberrations such as the curvature of field and so forth increases at the time of image stabilization, which is undesirable. Therefore, it is generally not desirable that conditional expression (4) extends beyond its lower or upper limits.

The conditional expression (5) suitably defines a ratio between the focal length of the second lens subunit B3b for image stabilization and the focal length of the third lens subunit B3c. Excessively decreasing the focal length of the third lens subunit B3c beyond the upper limit of the conditional expression (5) increases fluctuation of axial chromatic aberration at the time of zooming. In order to correct this, the number of lenses in the third lens subunit B3c has to be increased, and reduction in size of the zoom lens is difficult. Excessively decreasing the absolute value of the focal length of the second lens subunit B3b beyond the lower limit of the conditional expression (5) undesirably increases fluctuation of various aberrations such as field curvatures and so forth at the time of image stabilization, which is undesirable. In other words, it is generally undesirable to operate outside the range of values defined by the lower or upper limits of conditional expression (5).

The conditional expression (6) suitably defines a ratio between the focal length of the third lens unit B3 and back focus at the wide angle end. Excessively increasing the focal length of the third lens unit B3 beyond the upper limit of the conditional expression (6) increases fluctuation of spherical aberrations or field curvatures at the time of zooming, and correction of these aberrations is difficult. Back focus exceeding the lower limit of the conditional expression (6) makes reduction in size of the zoom lens difficult.

The conditional expression (7) suitably defines a ratio between the focal length of the second lens unit B2 and back focus at the wide angle end. Excessively increasing the absolute value of the focal length of the second lens unit B2 beyond the upper limit of the conditional expression (7) makes desired zooming advantages difficult to obtain, the moving distance of the moving lens unit has to be increased at the time of zooming, and reduction in size of the zoom lens is difficult. Excessively decreasing absolute value of the focal length of the second lens unit B2 beyond the lower limit of the conditional expression (7) increases fluctuation of field curvatures at the time of zooming, the distortion aberration at the wide angle end increases, and correction of this is difficult.

The conditional expression (8) suitably defines a ratio between the focal length of the second lens unit B2 and the focal length of the zoom lens at the telephoto end. Excessively increasing the absolute value of the focal length of the second lens unit B2 beyond the upper limit of the conditional expression (8) makes the desired zoom ratio difficult to be obtained, the overall lens length has to be increased to realize increase in a high zoom ratio, and reduction in size of the zoom lens is difficult. Excessively decreasing the absolute value of the focal length of the second lens unit B2 beyond the lower limit of the conditional expression (8) increases fluctuation of field curvatures at the time of zooming, the distortion aberration at the wide angle end increases, and correction of this is difficult.

The conditional expression (9) suitably defines a ratio between the focal length of the first lens unit B1 and the focal length of the zoom lens at the telephoto end. Excessively increasing the focal length of the first lens unit B1 beyond the upper limit of the conditional expression (9) makes the desired focal length of the zoom lens to be difficult to be obtained, the entire length has to be increased, and reduction in size of the zoom lens is difficult. Excessively decreasing the focal length of the first lens unit B1 beyond the lower limit of the conditional expression (9) increases the axial chromatic aberration or spherical aberration at the telephoto end, and correction of these various aberrations is difficult.

The conditional expression (10) suitably defines a ratio between the overall lens length at the telephoto end and the focal length of the zoom lens at the telephoto end. Deviating from the range of the conditional expression (10) makes reduction in size of the zoom lens difficult.

Although, as defined above, it is generally not desirable to operate outside the lower or upper limits of conditional expressions (1) to (10), it is however permissible to within a narrower range of values than those defined by the lower or upper limits of conditional expressions (1) to (10). More specifically, it may be preferable, that the numeric value ranges of condition expressions (1a) to (10a) be set as follows.

$5.5 < ft/f3 < 9.0$ (1a)

$0.65 < f3a/|f3b| < 1.0$ (2a)

$0.75 < f3a/f3 < 1.00$ (3a)

$0.8 < |f3b|/f3 < 1.3$ (4a)

$1.00 < |f3b|/f3c < 1.35$ (5a)

$1.10 < f3/skw < 1.80$ (6a)

$1.0 < |f2|/skw < 1.5$ (7a)

$0.08 < |f2|/ft < 0.14$ (8a)

$0.3 < f1/ft < 0.6$ (9a)

$0.7 < TL/ft < 0.8$ (10a)

Further preferably, the numeric value ranges of condition expressions (1b) to (10b) should be set as follows.

$6.8 < ft/f3 < 7.9$ (1b)

$0.72 < f3a/|f3b| < 0.87$ (2b)

$0.86 < f3a/f3 < 0.91$ (3b)

$1.02 < |f3b|/f3 < 1.20$ (4b)

$1.18 < |f3b|/f3c < 1.32$ (5b)

$1.41 < f3/skw < 1.62$ (6b)

$1.2 < |f2|/skw < 1.4$ (7b)

$0.10 < |f2|/ft < 0.14$ (8b)

$0.44 < f1/ft < 0.50$ (9b)

$0.71 < TL/ft < 0.77$ (10b)

As described above, the lens configuration of each lens unit, and zooming load due to the distribution of refractive power are set suitably in the embodiments, thereby obtaining a zoom lens having high image-forming performance even with a wide view angle.

It is desirable in the embodiments that at least three lens units move onto the optical axis at the time of zooming. In particular, it is desirable to move the first lens unit B1. Thus, fluctuation of aberrations at the time of zooming can readily be corrected in a suitable manner. Moreover, the first lens unit B1 can have the minimum lens effective diameter in accordance with the incident height of off-axis light flux at the time of zooming, thereby facilitating reduction in size of the first lens unit B1.

Also, it is desirable to move at least three lens units including the third lens unit B3 onto the optical axis at the time of zooming. In particular, moving the third lens unit B3 including the aperture diaphragm SP facilitates minimization of the effective diameter of the second lens subunit B3b while suitably securing peripheral light quantity.

Also, it is desirable to move all of the lens units at the time of zooming. Thus, reduction in size of the zoom lens, and suitable aberration correction are readily performed. Also, it is desirable to move all of the lens units to the object side alone at the time of zooming from the wide angle end to the telephoto end. Thus, movement of the mechanism and so forth is facilitated, and influence such as manufacturing error and so forth is not readily received, which is desirable for maintaining high image quality. Also, it is desirable for the second lens subunit B3b having an image stabilization function to include at least one pair of a lens having positive refractive power (positive lens) and a lens having negative refractive power (negative lens).

Thus, suitably performing correction of a chromatic aberration at the time of image stabilization is facilitated. Also, occurrence of a decentration aberration at the time of image stabilization can readily be reduced. Further, reduction in size of the second lens subunit B3b is facilitated. Also, it is desirable for the rear lens group including one or more lens units disposed closer to the image side than the third lens unit B3 to have negative refractive power by composition. Thus, the exit pupil can readily be reduced to optional distance, and the overall lens length can readily be reduced.

It is desirable in the embodiments to dispose the aperture diaphragm SP closer to the image side within the first lens subunit B3a. Disposing the aperture diaphragm SP on the second lens subunit B3b side reduces the incident height of off-axis light flux in the vicinity of the second lens subunit B3b. Thus, the effective diameter of the second lens subunit B3b can readily be reduced, and reduction in size of the second lens subunit B3b for image stabilization can readily be performed. In order to suitably perform correction of a spherical aberration while improving a converging advantage of an on-axis light flux obtained by the first lens subunit B3a, the first lens subunit B3a is, in the order from the object side to the image side, configured including a positive lens, a positive lens, a negative lens, and the aperture diaphragm SP. Further, it is desirable to dispose a lens having an aspherical surface closest to the image side.

Disposing a positive lens with strong positive refractive power on the object side of the first lens subunit B3a facilitates improvement in the converging advantage of an on-axis light flux, and the aperture diaphragm SP is disposed on the image side of the first lens subunit B3a. Thus, the incident height of off-axis light flux can be reduced on the second lens subunit B3b side, and reduction in size of the second lens subunit B3b can readily be performed. Further, the incident height itself of the on-axis light flux is high in positions near the aperture diaphragm SP, and also, the incident height of the off-axis ray approximates thereto and passes through generally the same position. Therefore, disposing a lens having an aspherical surface thereto facilitates suitable correction of a spherical aberration according to the on-axis light flux and a chromatic aberration according to the off-axis ray at the same time.

Note that the first lens unit B1 to third lens unit B3 of the positive, negative, and positive refractive power are disposed in the order from the object side to the image side in the embodiments. Though the lens unit having negative refractive power is disposed closer to the image side than the third lens unit B3, or the lens unit having negative refractive power and the lens unit having positive refractive power are disposed in order, the configuration closer to the image side than the third lens unit B3 is not restricted to this, and an optional lens configuration may be employed. The fourth lens unit B4 includes a fourth A lens subunit B4a having strong negative refractive power on the object side in the embodiments. Though focusing from infinity to near distance is performed by moving this fourth A lens subunit B4a to the image side, focusing may be performed by another lens unit such as the first lens unit B1 or the like.

In FIG. 16, reference numeral 20 denotes a camera main body, and 21 denotes an imaging optical system configured including at least one zoom lens described in the first to fifth embodiments. 22 denotes an image pickup element (photoelectric conversion element) such as a CCD sensor or CMOS sensor configured to receive a subject image formed by the imaging optical system 21, and is built into the camera. Note that the zoom lenses according to the embodiments can also be applied to a single-lens reflex camera with a quick-return mirror, and a single-lens reflex camera without a quick-return mirror.

Hereinafter, first to fifth numerical embodiments corresponding to the first to fifth embodiments respectively will be illustrated. In the numerical embodiments, i denotes a surface sequential number from the object side, ri denotes the i-th (i-th surface) curvature radius, di denotes an interval between the i-th surface and i+1-th surface, and ndi and vdi denote the refractive index and Abbe number of the material of the i-th optical member with a d-line as a reference respectively. Also, two surfaces closest to the image side are planes equivalent to an optical block in the first to fifth numerical embodiments. Displacement in the optical axis direction at a position with height H from the optical axis regarding an aspherical shape is X with the surface vertex as a reference. The advancing direction of light is positive, R is a paraxial curvature radius, K is a conic constant, and A4, A6, A8, A10, and A12 are aspherical coefficients. At this time, the X is represented by the following expression.

$$X = \frac{H^2 R}{1 + \sqrt{1 - (1+K)(H/R)^2}} + A4H^4 + A6H^6 + A8H^8 + A10H^{10} + A12H^{12}$$

In the tabulated values below, an asterisk "*" next to surface number means a surface having an aspherical shape. The expression "e-x" means $10^{-x}$. A half field angle denotes a half field angle according to a ray tracing value. BF denotes back focus, which is air conversion distance from the final lens surface to the image-forming plane position excluding a glass block such as the face plate of a sensor on the image sensing surface side and a low-pass filter and so forth. Relations between the above-described conditional expressions and the various numeric values in the numerical embodiments will be illustrated in Table 1.

First Numerical Embodiment

| | Unit: mm Surface Data | | | |
|---|---|---|---|---|
| Surface No. | r | d | nd | vd |
| 1 | 47.579 | 3.00 | 1.48749 | 70.2 |
| 2 | 187.623 | 0.20 | | |
| 3 | 72.401 | 1.50 | 1.80610 | 40.9 |
| 4 | 32.025 | 5.20 | 1.48749 | 70.2 |
| 5 | −270.270 | (variable) | | |
| 6 | −108.486 | 0.90 | 1.72000 | 50.2 |
| 7 | 16.905 | 2.70 | 1.84666 | 23.9 |
| 8 | 41.931 | 2.01 | | |
| 9 | −34.559 | 0.90 | 1.77250 | 49.6 |
| 10 | 270.270 | (variable) | | |
| 11 | 21.716 | 3.60 | 1.66672 | 48.3 |

-continued

| | | | | |
|---|---|---|---|---|
| 12 | −147.608 | 1.90 | | |
| 13 | 16.044 | 5.00 | 1.49700 | 81.5 |
| 14 | −65.374 | 0.90 | 1.84666 | 23.9 |
| 15 | 32.233 | 2.90 | | |
| 16 (diaphragm) | ∞ | 3.10 | | |
| 17* | 98.001 | 2.20 | 1.58313 | 59.4 |
| 18* | 5000.000 | 3.50 | | |
| 19 | −74.987 | 1.50 | 1.80610 | 33.3 |
| 20 | −18.582 | 0.60 | 1.69350 | 53.2 |
| 21 | 24.830 | 3.00 | | |
| 22 | 18.004 | 2.80 | 1.48749 | 70.2 |
| 23 | −32.642 | (variable) | | |
| 24 | 258.313 | 0.60 | 1.69680 | 55.5 |
| 25 | 11.294 | 2.00 | 1.54072 | 47.2 |
| 26 | 29.836 | 12.62 | | |
| 27 | −28.543 | 3.30 | 1.76200 | 40.1 |
| 28 | −13.619 | 1.00 | 1.51633 | 64.1 |
| 29 | −72.548 | (variable) | | |
| 30 | ∞ | 1.50 | 1.54400 | 60.0 |
| 31 | ∞ | 1.73 | | |

Image Plane ∞
Aspherical Surface Data 17-th Surface

| | | |
|---|---|---|
| K = 0.00000e+000 | A4 = −7.46980e−005 | A6 = 6.83135e−007 |
| A8 = 6.66992e−009 | A10 = −5.06108e−011 | A12 = −9.57784e−014 |

18-th Surface

| | | |
|---|---|---|
| K = 0.00000e+000 | A4 = 4.14298e−005 | A6 = 1.13094e−006 |
| A8 = 6.67895e−009 | | |

Various Types of Data
Zoom Ratio: 3.45

| | Wide Angle | Intermediate | Telephoto |
|---|---|---|---|
| Focal Length | 56.60 | 134.00 | 195.00 |
| F-number | 4.50 | 5.70 | 6.45 |
| Half Field Angle (degree) | 13.57 | 5.82 | 4.01 |
| Image Height | 13.66 | 13.66 | 13.66 |
| Overall Lens Length | 103.39 | 130.12 | 144.77 |
| BF | 17.70 | 28.38 | 40.78 |
| d5 | 1.40 | 26.09 | 34.14 |
| d10 | 15.35 | 4.17 | 0.80 |
| d23 | 2.00 | 4.54 | 2.10 |
| d29 | 15.00 | 25.68 | 38.08 |

Zoom Lens Unit Data

| Unit | Starting Surface | Focal Length |
|---|---|---|
| 1 | 1 | 93.52 |
| 2 | 6 | −21.90 |
| 3 | 11 | 26.02 |
| 4a | 24 | −33.93 |
| 4b | 27 | −4057.03 |

Second Numerical Embodiment

Unit: mm
Surface Data

| Surface No. | r | d | nd | vd |
|---|---|---|---|---|
| 1 | 48.119 | 3.00 | 1.48749 | 70.2 |
| 2 | 201.498 | 0.20 | | |

-continued

| | | | | |
|---|---|---|---|---|
| 3 | 71.951 | 1.50 | 1.80610 | 40.9 |
| 4 | 31.860 | 5.20 | 1.48749 | 70.2 |
| 5 | −285.518 | (variable) | | |
| 6 | −92.574 | 0.90 | 1.72000 | 50.2 |
| 7 | 18.111 | 2.70 | 1.84666 | 23.9 |
| 8 | 46.952 | 1.80 | | |
| 9 | −45.312 | 0.90 | 1.77250 | 49.6 |
| 10 | 210.852 | (variable) | | |
| 11 | 21.200 | 3.60 | 1.66672 | 48.3 |
| 12 | −322.417 | 1.90 | | |
| 13 | 16.414 | 5.00 | 1.49700 | 81.5 |
| 14 | −83.325 | 0.90 | 1.84666 | 23.9 |
| 15 | 28.101 | 2.90 | | |
| 16 (diaphragm) | ∞ | 3.10 | | |
| 17* | 107.117 | 2.20 | 1.58313 | 59.4 |
| 18* | 5000.000 | 3.50 | | |
| 19 | −62.876 | 1.50 | 1.80610 | 33.3 |
| 20 | −17.814 | 0.60 | 1.69350 | 53.2 |
| 21 | 25.410 | 3.02 | | |
| 22 | 18.605 | 2.80 | 1.48749 | 70.2 |
| 23 | −29.243 | (variable) | | |
| 24 | 783.879 | 0.60 | 1.69680 | 55.5 |
| 25 | 11.627 | 2.00 | 1.54072 | 47.2 |
| 26 | 33.610 | 13.36 | | |
| 27 | −36.199 | 3.30 | 1.76200 | 40.1 |
| 28 | −14.492 | 1.00 | 1.51633 | 64.1 |
| 29 | −221.311 | (variable) | | |
| 30 | ∞ | 1.50 | 1.54400 | 60.0 |
| 31 | ∞ | 1.78 | | |

Image Plane ∞
Aspherical Surface Data 17-th Surface

| | | |
|---|---|---|
| K = 0.00000e+000 | A4 = −2.53570e−005 | A6 = 4.03139e−007 |
| A8 = 1.22767e−008 | A10 = −1.35636e−010 | A12 = 4.42450e−013 |

18-th Surface

| | | |
|---|---|---|
| K = 0.00000e+000 | A4 = 8.91706e−005 | A6 = 8.53290e−007 |
| A8 = 1.09231e−008 | | |

Various Types of Data
Zoom Ratio: 3.45

| | Wide Angle | Intermediate | Telephoto |
|---|---|---|---|
| Focal Length | 56.58 | 135.17 | 195.00 |
| F-number | 4.50 | 6.15 | 6.45 |
| Half Field Angle (degree) | 13.57 | 5.77 | 4.01 |
| Image Height | 13.66 | 13.66 | 13.66 |
| Overall Lens Length | 109.34 | 131.70 | 141.69 |
| BF | 17.75 | 30.08 | 37.43 |
| d5 | 1.53 | 23.89 | 33.88 |
| d10 | 20.58 | 5.87 | 0.80 |
| d23 | 2.00 | 4.38 | 2.10 |
| d29 | 15.00 | 27.33 | 34.68 |

Zoom Lens Unit Data

| Unit | Starting Surface | Focal Length |
|---|---|---|
| 1 | 1 | 93.61 |
| 2 | 6 | −24.71 |
| 3 | 11 | 28.18 |
| 4a | 24 | −34.63 |
| 4b | 27 | −1000.00 |

Third Numerical Embodiment

| | Unit: mm | | | |
|---|---|---|---|---|
| | Surface Data | | | |
| Surface No. | r | d | nd | vd |
| 1 | 48.766 | 3.00 | 1.51633 | 64.1 |
| 2 | 212.962 | 0.20 | | |
| 3 | 70.883 | 1.50 | 1.80400 | 46.6 |
| 4 | 31.184 | 5.20 | 1.49700 | 81.5 |
| 5 | −375.597 | (variable) | | |
| 6 | −138.738 | 0.90 | 1.69680 | 55.5 |
| 7 | 16.208 | 2.70 | 1.84666 | 23.8 |
| 8 | 36.944 | 2.05 | | |
| 9 | −36.879 | 0.90 | 1.83400 | 37.2 |
| 10 | 199.896 | (variable) | | |
| 11 | 24.320 | 3.60 | 1.80610 | 33.3 |
| 12 | −227.270 | 1.90 | | |
| 13 | 14.148 | 5.00 | 1.49700 | 81.5 |
| 14 | −347.930 | 0.90 | 1.92286 | 18.9 |
| 15 | 25.659 | 2.90 | | |
| 16 (diaphragm) | ∞ | 3.10 | | |
| 17* | 142.182 | 2.20 | 1.85400 | 40.4 |
| 18* | 5000.000 | 3.50 | | |
| 19 | −102.959 | 1.50 | 1.92286 | 18.9 |
| 20 | −29.036 | 0.60 | 1.74950 | 35.3 |
| 21 | 23.182 | 3.00 | | |
| 22 | 15.754 | 2.80 | 1.49700 | 81.5 |
| 23 | −42.810 | (variable) | | |
| 24 | 354.884 | 0.60 | 1.80610 | 40.9 |
| 25 | 11.854 | 2.00 | 1.51823 | 58.9 |
| 26 | 35.655 | 10.51 | | |
| 27 | −31.777 | 3.30 | 2.00100 | 29.1 |
| 28 | −14.648 | 1.00 | 1.60311 | 60.6 |
| 29 | −333.333 | (variable) | | |
| 30 | −199.416 | 2.00 | 1.84666 | 23.8 |
| 31 | −54.977 | 15.00 | | |
| 32 | ∞ | 1.50 | 1.54400 | 60.0 |
| 33 | ∞ | 1.73 | | |

Image Plane ∞
Aspherical Surface Data 17-th Surface $K = 0.00000e+000$  $A4 = -4.63820e-005$  $A6 = 1.13035e-006$
$A8 = 6.99966e-009$  $A10 = -3.11259e-011$  $A12 = -6.86937e-013$ 18-th Surface $K = 0.00000e+000$  $A4 = 4.72363e-005$  $A6 = 1.54569e-006$
$A8 = 9.36013e-009$ Various Types of Data
Zoom Ratio: 3.45

| | Wide Angle | Intermediate | Telephoto |
|---|---|---|---|
| Focal Length | 56.60 | 136.00 | 195.00 |
| F-number | 4.46 | 5.63 | 6.45 |
| Half Field Angle (degree) | 13.57 | 5.74 | 4.01 |
| Image Height | 13.66 | 13.66 | 13.66 |
| Overall Lens Length | 103.39 | 131.62 | 145.39 |
| BF | 17.70 | 17.70 | 17.70 |
| d5 | 1.33 | 25.77 | 32.43 |
| d10 | 14.51 | 4.23 | 0.80 |
| d23 | 2.00 | 3.94 | 2.62 |
| d29 | 1.00 | 13.12 | 24.99 |

Zoom Lens Unit Data

| Unit | Starting Surface | Focal Length |
|---|---|---|
| 1 | 1 | 90.39 |
| 2 | 6 | −21.56 |
| 3 | 11 | 25.05 |
| 4a | 24 | −27.07 |

-continued

| 4b | 27 | −980.27 |
| 5 | 30 | 89.08 |

Fourth Numerical Embodiment

Unit: mm
Surface Data

| Surface No. | r | d | nd | vd |
| --- | --- | --- | --- | --- |
| 1 | 47.999 | 3.00 | 1.51633 | 64.1 |
| 2 | 199.205 | 0.20 | | |
| 3 | 79.213 | 1.50 | 1.80400 | 46.6 |
| 4 | 32.093 | 5.20 | 1.49700 | 81.5 |
| 5 | −264.415 | (variable) | | |
| 6 | −114.148 | 0.90 | 1.71300 | 53.9 |
| 7 | 17.305 | 2.70 | 1.84666 | 23.8 |
| 8 | 45.783 | 2.21 | | |
| 9 | −37.834 | 0.90 | 1.83400 | 37.2 |
| 10 | 207.695 | (variable) | | |
| 11 | 22.376 | 3.60 | 1.80610 | 33.3 |
| 12 | −1211.448 | 1.90 | | |
| 13 | 15.765 | 5.00 | 1.49700 | 81.5 |
| 14 | −118.529 | 0.90 | 1.92286 | 18.9 |
| 15 | 24.712 | 2.90 | | |
| 16 (diaphragm) | ∞ | 3.10 | | |
| 17* | 81.614 | 2.20 | 1.85400 | 40.4 |
| 18* | 5000.000 | 3.50 | | |
| 19 | −1110.863 | 0.60 | 1.91082 | 35.3 |
| 20 | 15.810 | 1.70 | 1.92286 | 18.9 |
| 21 | 28.812 | 3.00 | | |
| 22 | 18.361 | 2.80 | 1.49700 | 81.5 |
| 23 | −32.586 | (variable) | | |
| 24 | 27.025 | 2.00 | 1.80809 | 22.8 |
| 25 | −44.006 | 0.60 | 2.00330 | 28.3 |
| 26 | 17.052 | 11.54 | | |
| 27 | −22.892 | 3.30 | 2.00100 | 29.1 |
| 28 | −13.107 | 1.00 | 1.60311 | 60.6 |
| 29 | −63.930 | (variable) | | |
| 30 | ∞ | 1.50 | 1.54400 | 60.0 |
| 31 | ∞ | 1.73 | | |

Image Plane ∞
Aspherical Surface Data 17-th Surface

| $K = 0.00000e+000$ | $A4 = -6.58448e-005$ | $A6 = 4.20856e-007$ |
| $A8 = 8.60004e-009$ | $A10 = 3.74105e-012$ | $A12 = -5.30209e-013$ |

18-th Surface

| $K = 0.00000e+000$ | $A4 = 7.52431e-006$ | $A6 = 6.99599e-007$ |
| $A8 = 1.00569e-008$ | | |

Various Types of Data
Zoom Ratio: 3.45

| | Wide Angle | Intermediate | Telephoto |
| --- | --- | --- | --- |
| Focal Length | 56.60 | 136.00 | 195.00 |
| F-number | 4.44 | 5.73 | 6.45 |
| Half Field Angle (degree) | 13.57 | 5.74 | 4.01 |
| Image Height | 13.66 | 13.66 | 13.66 |
| Overall Lens Length | 103.39 | 132.71 | 143.37 |
| BF | 17.70 | 32.64 | 41.48 |
| d5 | 1.36 | 25.98 | 32.73 |
| d10 | 16.08 | 5.54 | 0.80 |
| d23 | 2.00 | 2.29 | 2.10 |
| d29 | 15.00 | 29.95 | 38.78 |

-continued

| Zoom Lens Unit Data | | |
|---|---|---|
| Unit | Starting Surface | Focal Length |
| 1 | 1 | 93.59 |
| 2 | 6 | −22.65 |
| 3 | 11 | 26.44 |
| 4a | 24 | −32.44 |
| 4b | 27 | −1000.00 |

Fifth Numerical Embodiment

| Unit: mm Surface Data | | | | |
|---|---|---|---|---|
| Surface No. | r | d | nd | νd |
| 1 | 47.892 | 3.00 | 1.48749 | 70.2 |
| 2 | 194.405 | 0.20 | | |
| 3 | 71.819 | 1.50 | 1.80610 | 40.9 |
| 4 | 32.118 | 5.20 | 1.48749 | 70.2 |
| 5 | −273.637 | (variable) | | |
| 6 | −117.859 | 0.90 | 1.72000 | 50.2 |
| 7 | 16.693 | 2.70 | 1.84666 | 23.9 |
| 8 | 40.553 | 2.08 | | |
| 9 | −32.797 | 0.90 | 1.77250 | 49.6 |
| 10 | 321.397 | (variable) | | |
| 11 | 21.917 | 3.60 | 1.66672 | 48.3 |
| 12 | −137.271 | 1.90 | | |
| 13 | 15.585 | 5.00 | 1.49700 | 81.5 |
| 14 | −73.772 | 0.90 | 1.84666 | 23.9 |
| 15 | 30.304 | 2.90 | | |
| 16 (diaphragm) | ∞ | 3.10 | | |
| 17* | 89.177 | 2.20 | 1.58313 | 59.4 |
| 18* | 5000.000 | 3.50 | | |
| 19 | −77.256 | 1.50 | 1.80610 | 33.3 |
| 20 | −18.820 | 0.60 | 1.69350 | 53.2 |
| 21 | 24.634 | 3.00 | | |
| 22 | 17.658 | 2.80 | 1.48749 | 70.2 |
| 23 | −34.750 | (variable) | | |
| 24 | 289.119 | 0.60 | 1.69680 | 55.5 |
| 25 | 11.213 | 2.00 | 1.54072 | 47.2 |
| 26 | 29.096 | 12.89 | | |
| 27 | −28.990 | 3.30 | 1.76200 | 40.1 |
| 28 | −13.622 | 1.00 | 1.51633 | 64.1 |
| 29 | −63.329 | (variable) | | |
| 30 | ∞ | 1.50 | 1.54400 | 60.0 |
| 31 | ∞ | 1.73 | | |

Image Plane ∞
Aspherical Surface Data

| 17-th Surface | | |
|---|---|---|
| K = 0.00000e+000 | A4 = −8.81267e−005 | A6 = 6.56231e−007 |
| A8 = 8.85959e−009 | A10 = −5.44212e−011 | A12 = −1.28510e−013 |

| 18-th Surface | | |
|---|---|---|
| K = 0.00000e+000 | A4 = 2.90566e−005 | A6 = 1.12847e−006 |
| A8 = 8.62328e−009 | | |

| Various Types of Data Zoom Ratio: 3.45 | | | |
|---|---|---|---|
| | Wide Angle | Intermediate | Telephoto |
| Focal Length | 56.60 | 134.14 | 195.00 |
| F-number | 4.50 | 5.64 | 6.45 |
| Half Field Angle (degree) | 13.57 | 5.81 | 4.01 |
| Image Height | 13.66 | 13.66 | 13.66 |
| Overall Lens Length | 103.39 | 130.72 | 145.39 |
| BF | 17.70 | 28.68 | 41.48 |
| d5 | 1.35 | 26.25 | 33.75 |
| d10 | 15.08 | 4.27 | 0.80 |

-continued

|  |  |  |  |
|---|---|---|---|
| d23 | 2.00 | 4.25 | 2.10 |
| d29 | 15.00 | 25.98 | 38.78 |

Zoom Lens Unit Data

| Unit | Starting Surface | Focal Length |
|---|---|---|
| 1 | 1 | 92.51 |
| 2 | 6 | −21.51 |
| 3 | 11 | 25.76 |
| 4a | 24 | −32.96 |
| 4b | 27 | 812.18 |

TABLE 1

| CONDITIONAL EXPRESSION | | FIRST EMBODIMENT | SECOND EMBODIMENT | THIRD EMBODIMENT | FOURTH EMBODIMENT | FIFTH EMBODIMENT |
|---|---|---|---|---|---|---|
| (1) | ft/f3 | 7.495 | 6.920 | 7.783 | 7.375 | 7.570 |
| (2) | f3a/|f3b| | 0.749 | 0.857 | 0.771 | 0.758 | 0.740 |
| (3) | f3a/f3 | 0.876 | 0.892 | 0.865 | 0.893 | 0.875 |
| (4) | |f3b|/f3 | 1.170 | 1.041 | 1.123 | 1.178 | 1.182 |
| (5) | |f3b|/f3c | 1.255 | 1.234 | 1.195 | 1.294 | 1.246 |
| (6) | f3/skw | 1.470 | 1.588 | 1.416 | 1.494 | 1.455 |
| (7) | |f2|/skw | 1.237 | 1.392 | 1.218 | 1.280 | 1.216 |
| (8) | |f2|/ft | 0.112 | 0.127 | 0.111 | 0.116 | 0.110 |
| (9) | f1/ft | 0.480 | 0.480 | 0.464 | 0.480 | 0.474 |
| (10) | TL/ft | 0.746 | 0.730 | 0.749 | 0.738 | 0.749 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-099925, filed May 10, 2013 which is hereby incorporated by reference herein in its entirety.

What is claimed is:

1. A zoom lens comprising, in order from object side to image side:
   a first lens unit having positive refractive power;
   a second lens unit having negative refractive power;
   a third lens unit having positive refractive power; and
   a rear lens group including one or two lens units;
   wherein three or four lens units move so as to change an interval between adjacent lens units at the time of zooming;
   wherein the third lens unit includes, in order from the object side to the image side,
      a first lens subunit having positive refractive power,
      a second lens subunit having negative refractive power, and
      a third lens subunit having positive refractive power;
   wherein the second lens subunit moves in a direction having a component perpendicular to an optical axis regarding image blurring correction, and the first lens subunit includes three positive lenses and a negative lens, and
   wherein a focal length of the zoom lens at the telephoto end is ft, a focal length of the third lens unit is f3, and a conditional expression $5.0 < ft/f3 < 10.0$ is satisfied.

2. The zoom lens according to claim 1, wherein a focal length of the first lens subunit is f3a, a focal length of the second lens subunit is f3b, and a conditional expression $0.5 < f3a/|f3b| < 1.2$ is satisfied.

3. The zoom lens according to claim 1, wherein a focal length of the first lens subunit is f3a, and a conditional expression $0.6 < f3a/f3 < 1.3$ is satisfied.

4. The zoom lens according to claim 1, wherein a focal length of the second lens subunit is f3b, and a conditional expression $0.6 < |f3b|/f3 < 1.6$ is satisfied.

5. The zoom lens according to claim 1, wherein a focal length of the second lens subunit is f3b, a focal length of the third lens subunit is f3c, and a conditional expression $0.08 < |f3b|/f3c < 1.40$ is satisfied.

6. The zoom lens according to claim 1, wherein a back focus at the wide angle end is skw, and a conditional expression $0.9 < f3/skw < 2.0$ is satisfied.

7. The zoom lens according to claim 1, wherein a focal length of the second lens unit is f2, a back focus at the wide angle end is skw, and a conditional expression $0.6 < |f2|/skw < 2.0$ is satisfied.

8. The zoom lens according to claim 1, wherein a focal length of the second lens unit is f2, and a conditional expression $$0.05 < |f2|/ft < 0.15$$

is satisfied.

9. The zoom lens according to claim 1, wherein a focal length of the first lens unit is f1, and a conditional expression $$0.2 < f1/ft < 0.8$$

is satisfied.

10. The zoom lens according to claim 1, wherein an overall length of the zoom lens at the telephoto end is TL, and a conditional expression $$0.68 < TL/ft < 0.85$$

is satisfied.

11. The zoom lens according to claim 1, wherein the first lens subunit includes, in the order from the object side to the image side,
   a first lens having positive refractive power,
   a second lens having positive refractive power,
   a third negative lens having negative refractive power,
   an aperture diaphragm, and
   a fourth positive lens having an aspherical surface.

12. The zoom lens according to claim 1, wherein the second lens subunit includes
   a lens having positive refractive power, and
   a lens having negative refractive power.

13. The zoom lens according to claim 1, wherein an aperture diaphragm is disposed between lenses of the first lens subunit and two positive lenses included in the first lens subunit are disposed closer to the object side than the aperture diaphragm.

14. The zoom lens according to claim 1, wherein the rear lens group comprises a fourth lens unit, the fourth lens unit includes, in order from the object side to the image side,
   a fourth lens subunit having negative refractive power, and
   a fifth lens subunit having negative refractive power,
   wherein only the fourth lens subunit moves during focusing, and the fourth lens subunit and the fifth lens subunit integrally move during zooming when focusing at a point of infinity.

15. An image pickup apparatus comprising:
a zoom lens; and
an image pickup element configured to receive an image formed by the zoom lens,
wherein the zoom lens comprises, in order from object side to image side:
   a first lens unit having positive refractive power;
   a second lens unit having negative refractive power;
   a third lens unit having positive refractive power; and
   a rear lens group including one or two lens units;
   wherein three or four lens units move so as to change an interval between adjacent lens units at the time of zooming;
   wherein the third lens unit includes, in order from the object side to the image side,
      a first lens subunit having positive refractive power,
      a second lens subunit having negative refractive power, and
      a third lens subunit having positive refractive power;
   wherein the second lens subunit moves in a direction having a component perpendicular to an optical axis regarding image blurring correction, and the first lens subunit includes three positive lenses and a negative lens, and
   wherein a focal length of the zoom lens at the telephoto end is ft, a focal length of the third lens unit is f3, and a conditional expression $$5.0 < ft/f3 < 10.0$$

is satisfied.

* * * * *